F. L. FULLER.
CASH REGISTER.
APPLICATION FILED JULY 10, 1915.
1,301,678. Patented Apr. 22, 1919.
10 SHEETS—SHEET 1.
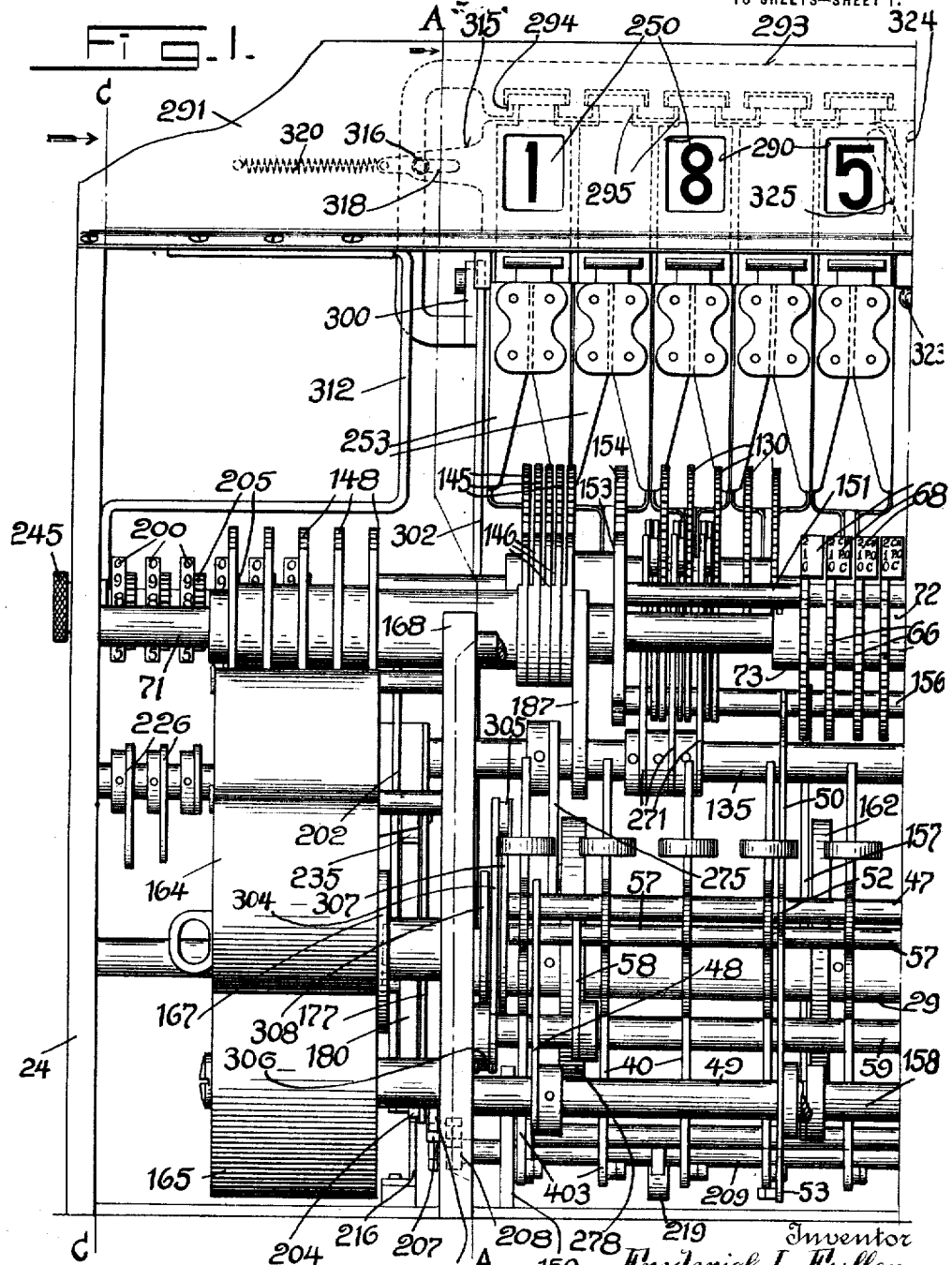
Inventor
Frederick L. Fuller
Attorneys

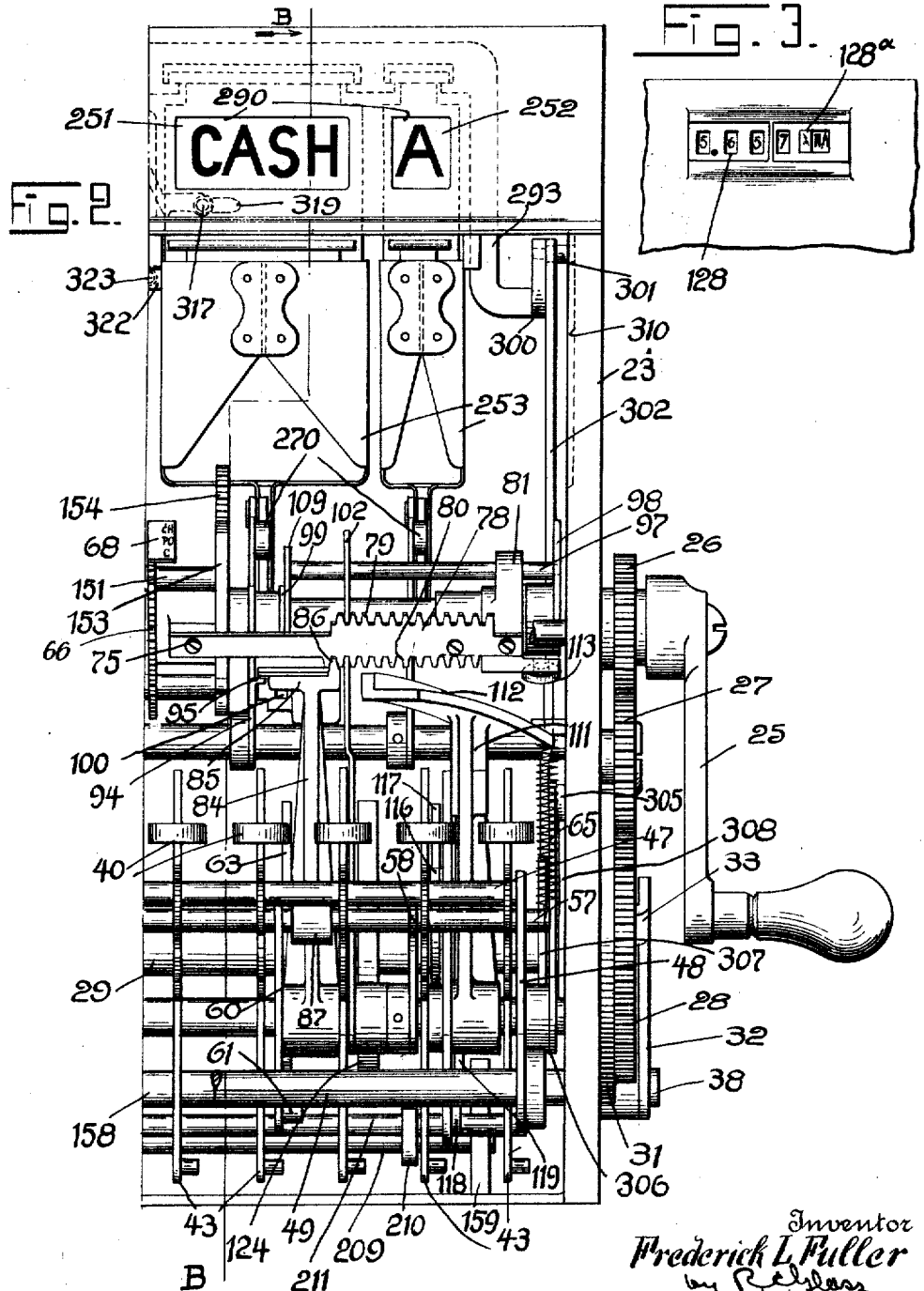

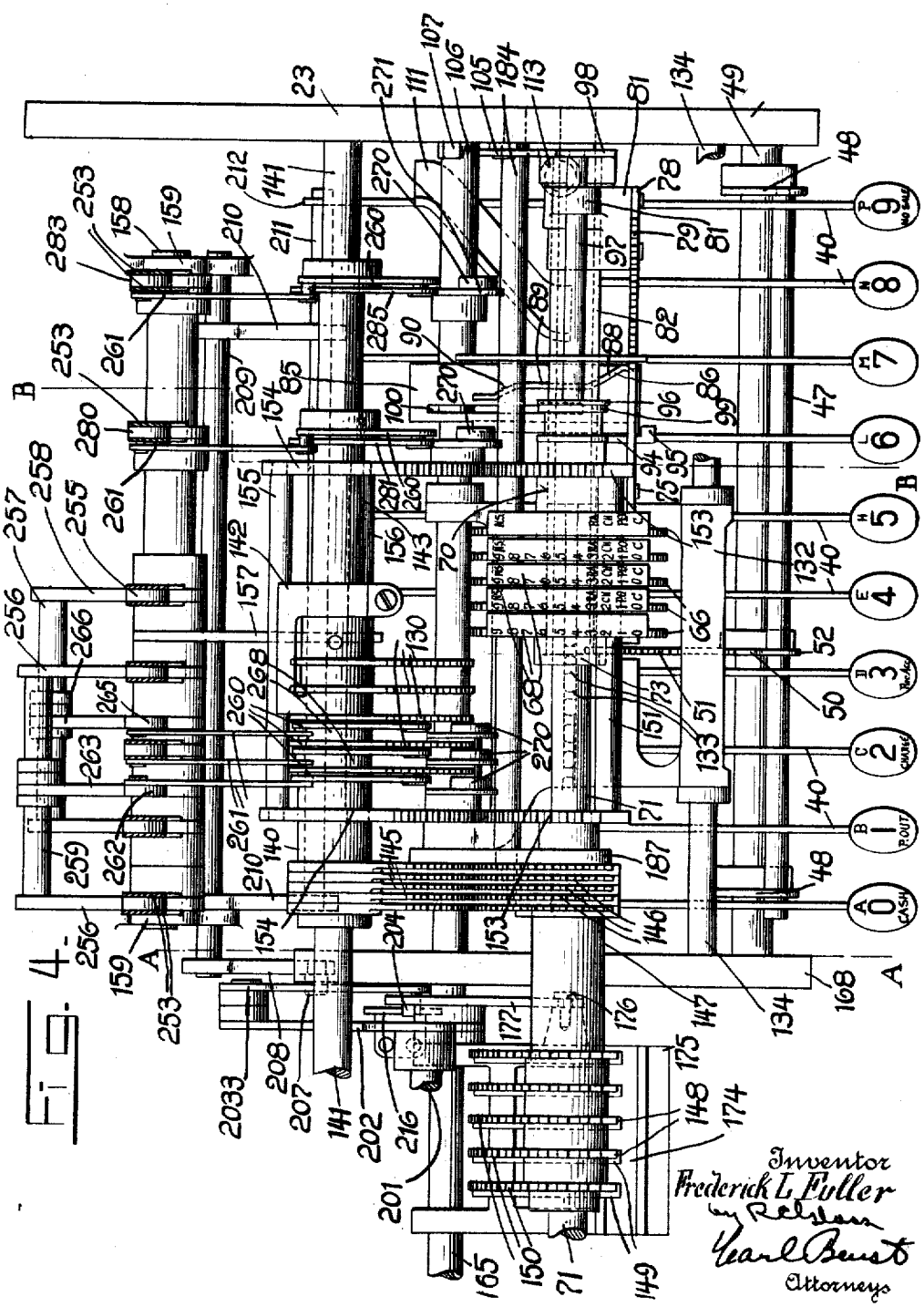

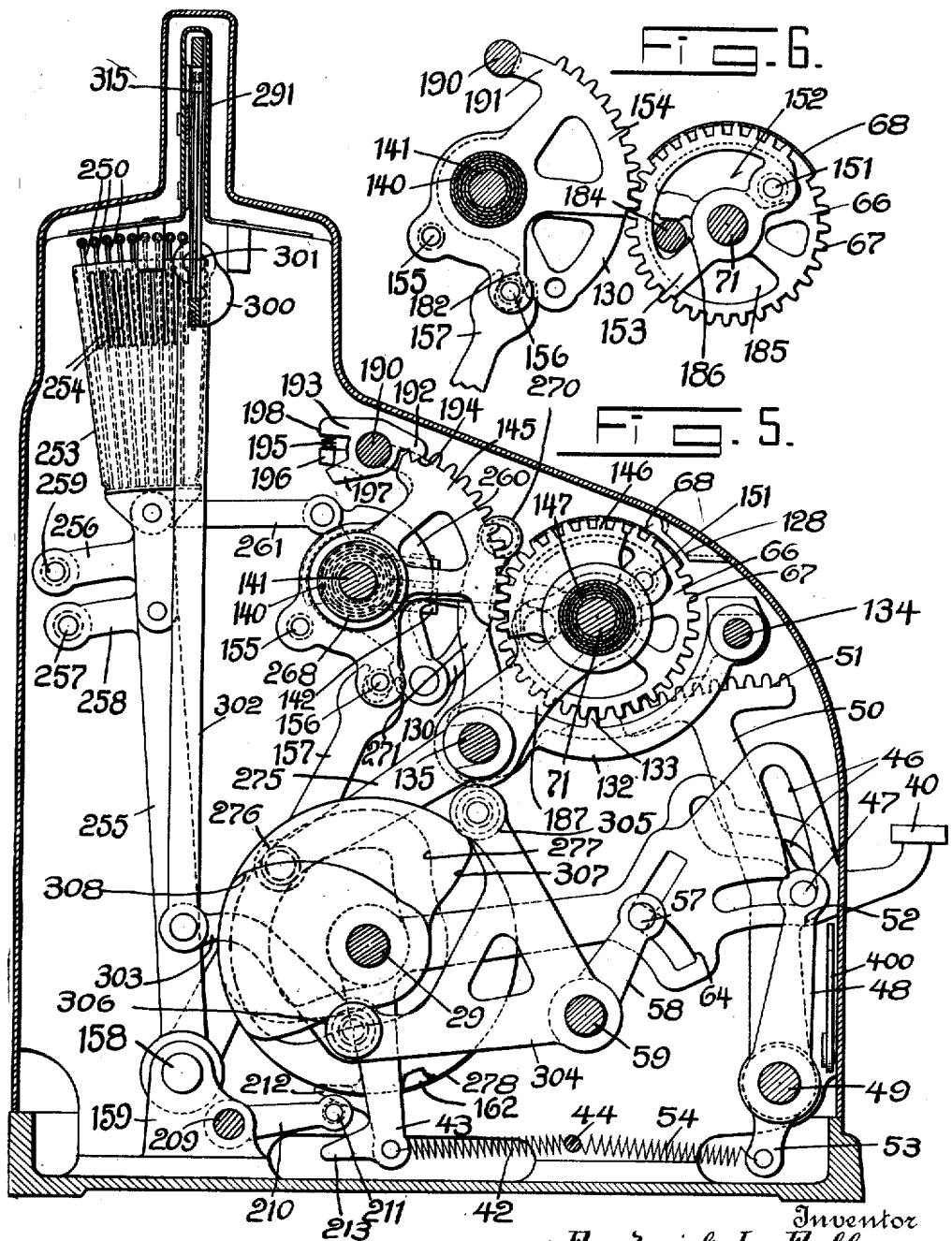

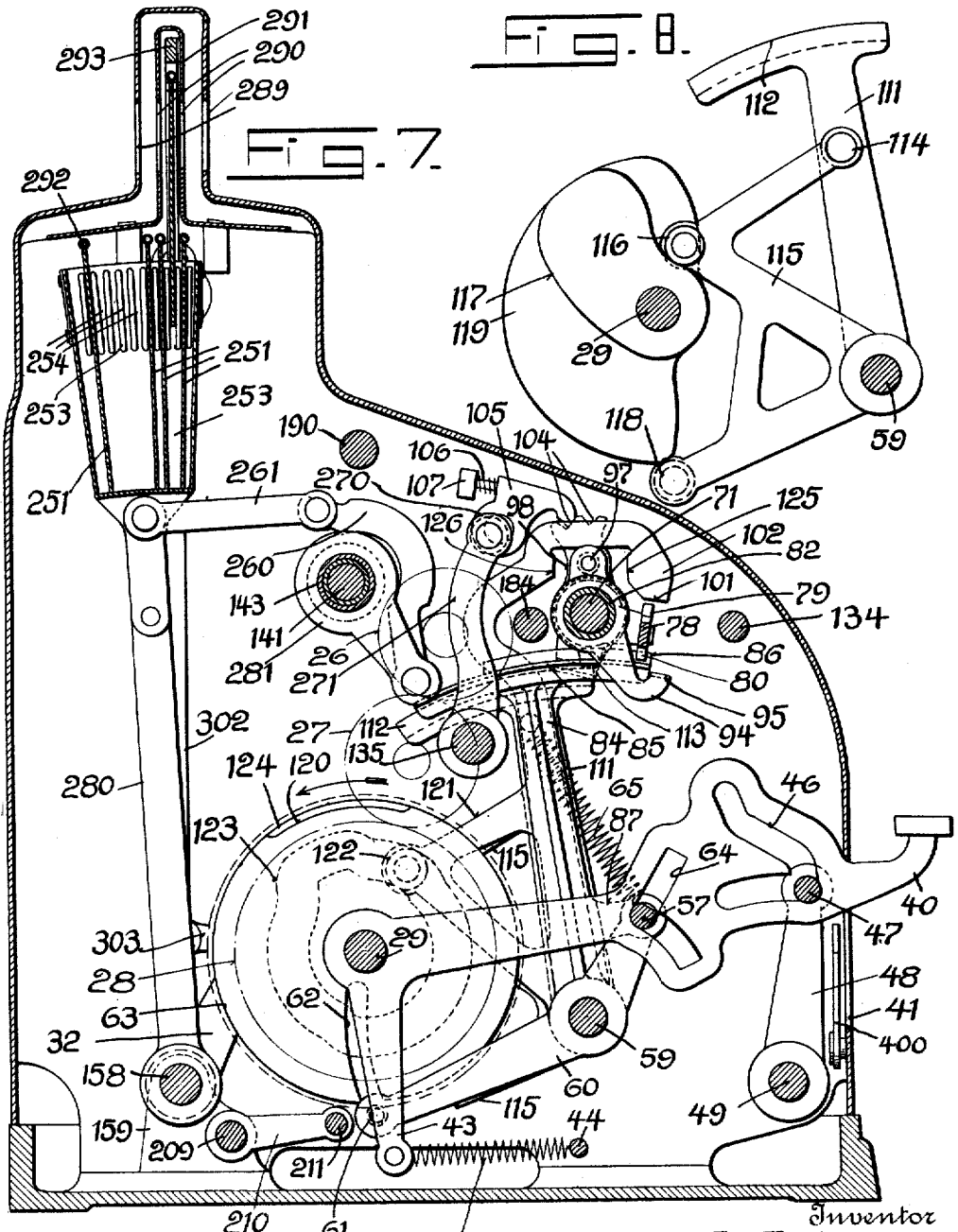

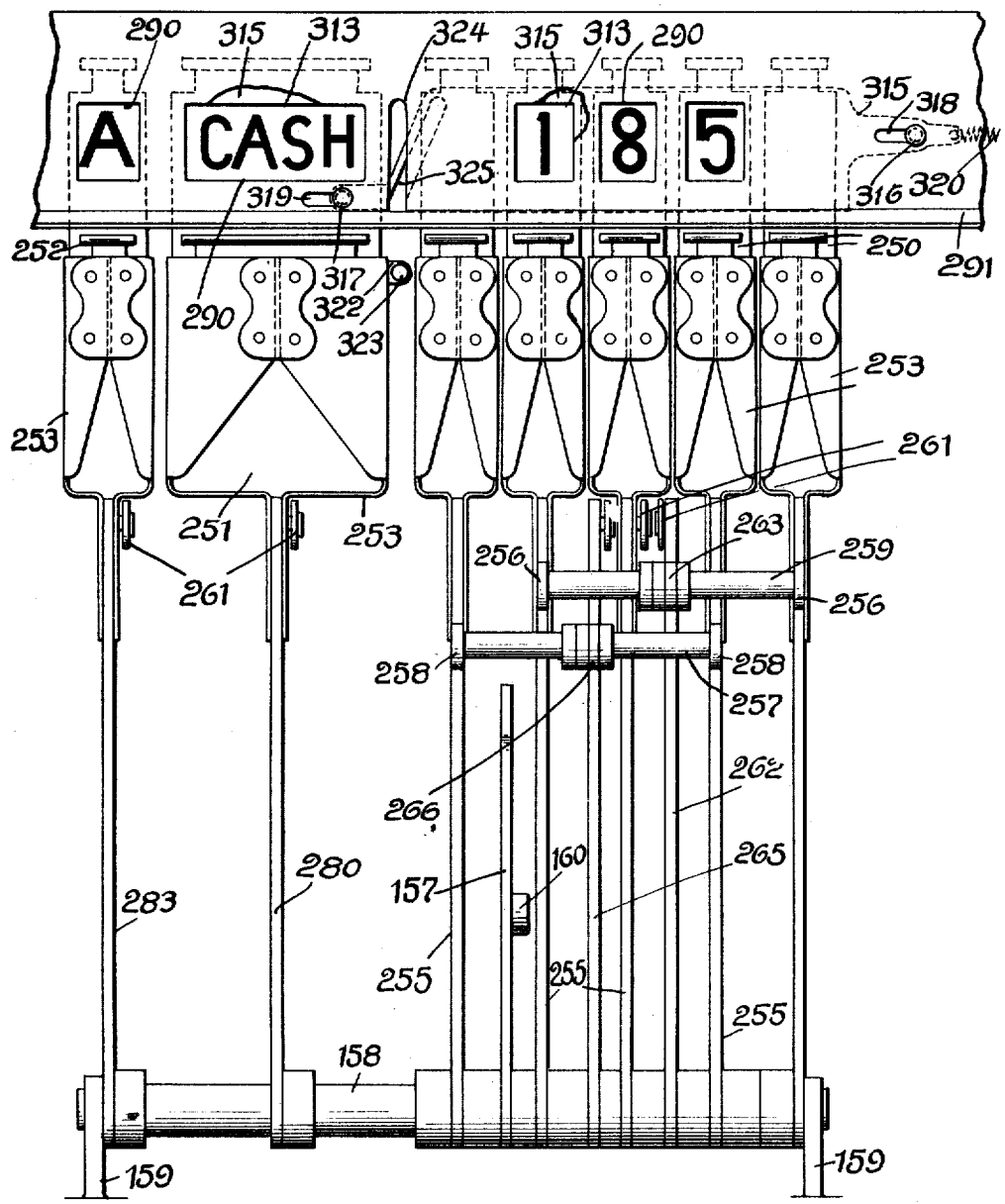

F. L. FULLER.
CASH REGISTER.
APPLICATION FILED JULY 10, 1915.
1,301,678.
Patented Apr. 22, 1919.
10 SHEETS—SHEET 7.
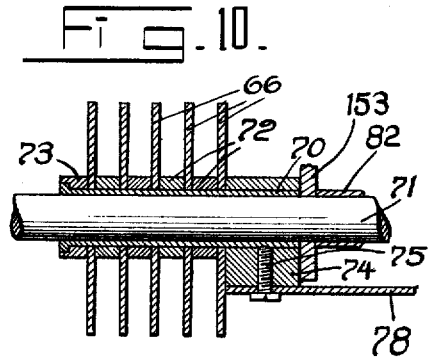
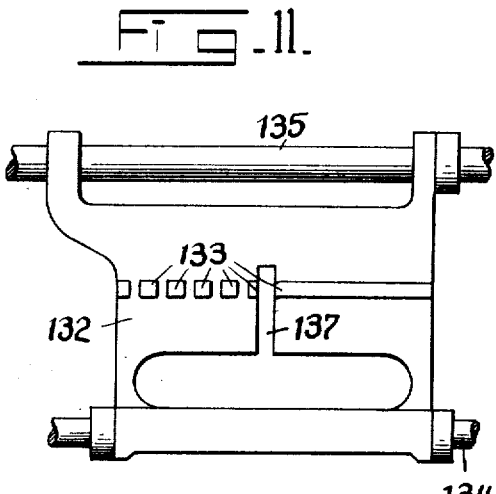
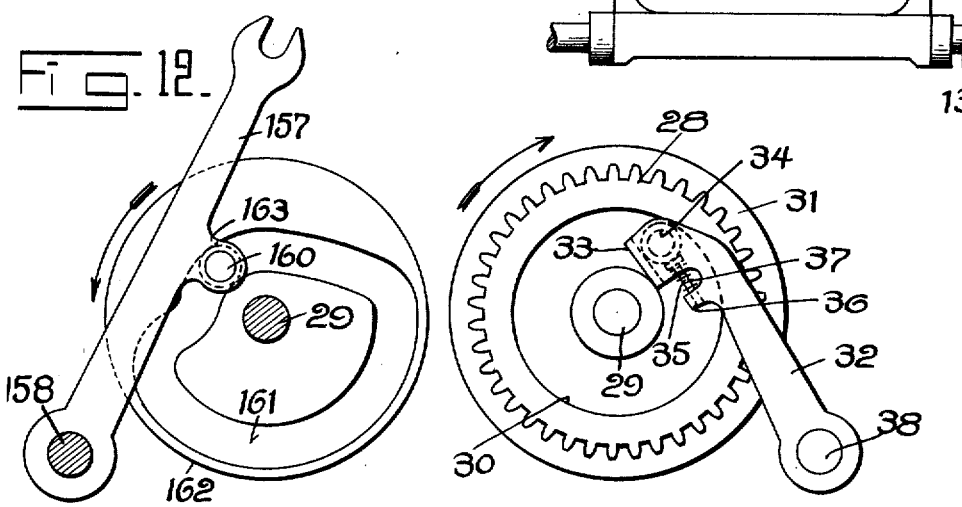
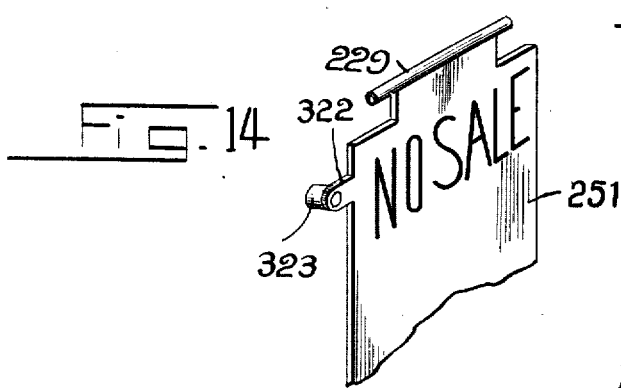
Inventor
Frederick L Fuller
Attorneys

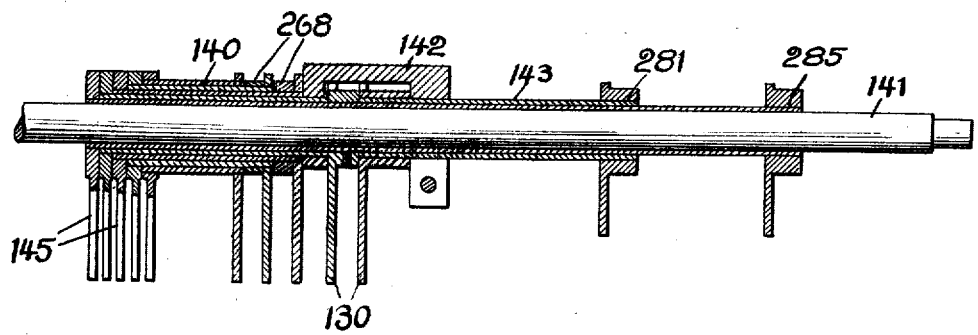
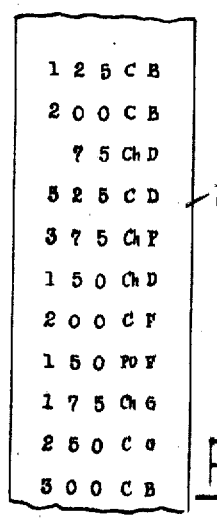
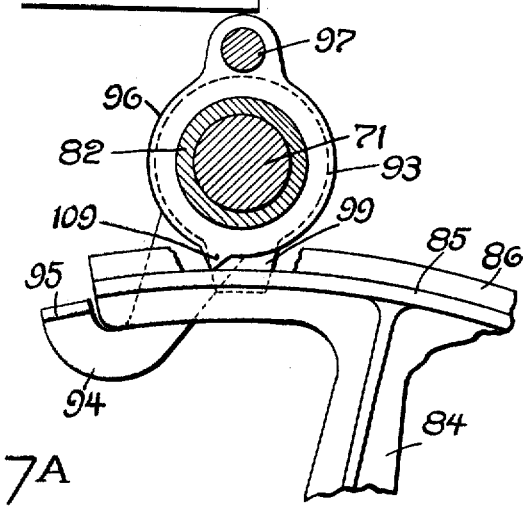
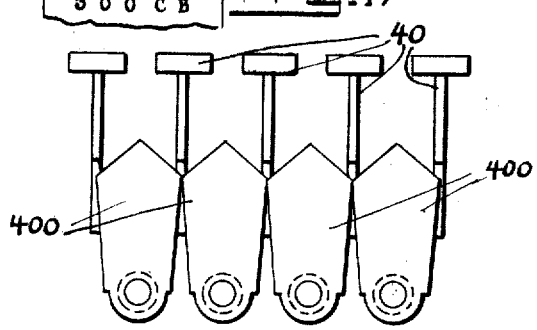

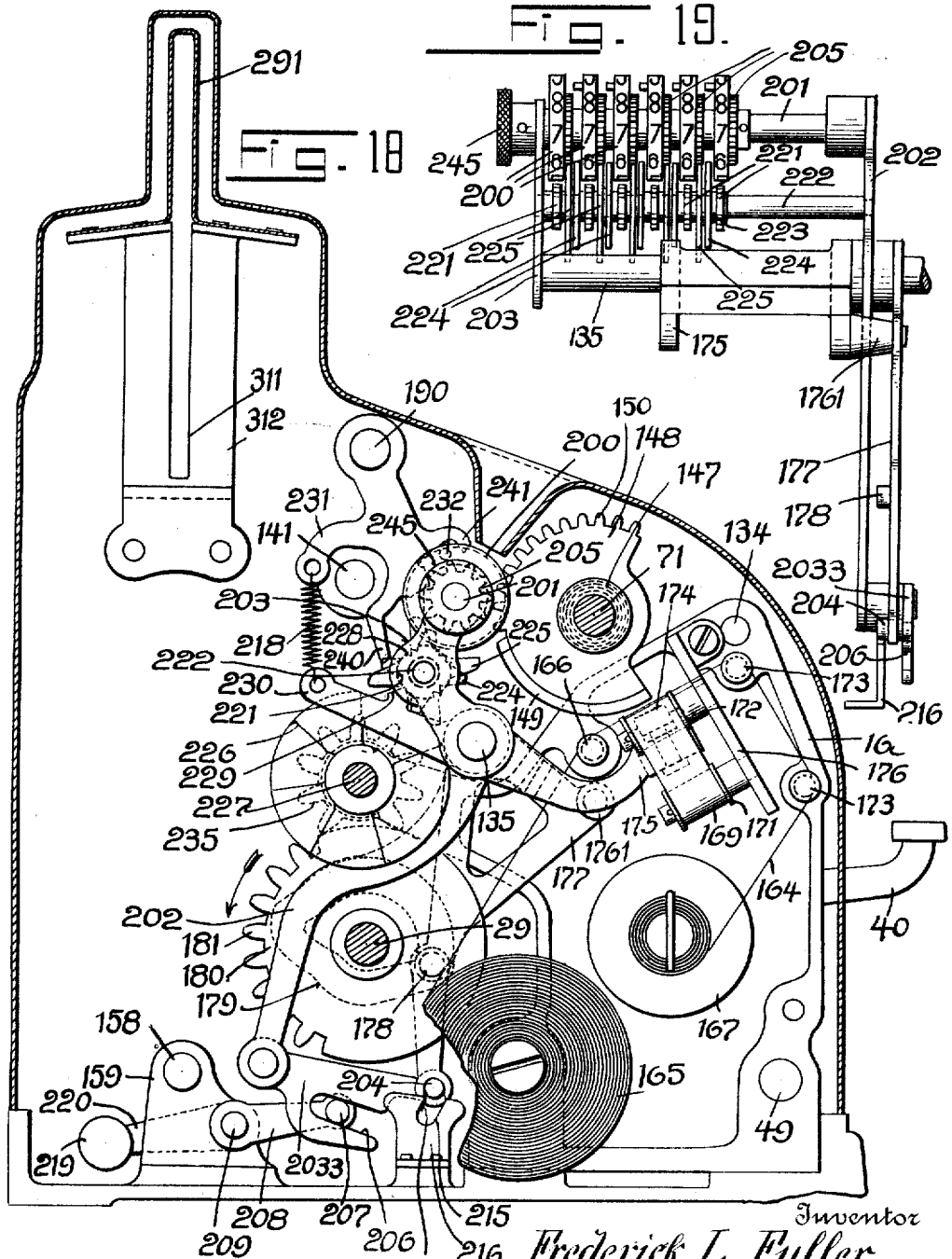

F. L. FULLER.
CASH REGISTER.
APPLICATION FILED JULY 10, 1913.

1,301,678.

Patented Apr. 22, 1919.
10 SHEETS—SHEET 10.

Inventor
Frederick L. Fuller
Attorneys

UNITED STATES PATENT OFFICE.

FREDERICK L. FULLER, OF DAYTON, OHIO, ASSIGNOR TO THE NATIONAL CASH REGISTER COMPANY, OF DAYTON, OHIO.

CASH-REGISTER.

1,301,678.     Specification of Letters Patent.     Patented Apr. 22, 1919.

Application filed July 10, 1915. Serial No. 39,113.

*To all whom it may concern:*

Be it known that I, FREDERICK L. FULLER, a citizen of the United States, residing at Dayton, in the county of Montgomery and State of Ohio, have invented certain new and useful Improvements in Cash-Registers, of which I declare the following to be a full, clear, and exact description.

This invention relates to accounting machines and the like and more particularly to that type known as ten key machines.

It is usual in accounting machines of the various types to provide manipulative amount determining means for controlling the amount differential mechanism of the machine and special manipulative means for controlling the indicating or recording of special characters to identify the clerk making each transaction, the class of each transaction, etc. Special and separate manipulative means are also employed in some accounting machines for controlling the selection of individual totalizers or counters for operation or for disabling the totalizer engaging mechanism on certain operations.

It is the principal object of this invention to construct a machine so that common manipulative means serve to accomplish the different functions of a plurality of manipulative means of different classes, heretofore employed. In the present form of embodiment disclosed herein one series of keys is employed to perform the functions previously performed by two or more adjustable levers or series of keys of different classes, thus reducing the space required by a plurality of levers or series of keys as well as simplifying the construction and operation of the machine.

It is thought that the present invention is the first in the art to provide a machine employing a series of keys each key being used to accomplish the different functions formerly accomplished by separate keys or levers. In the illustrative form of embodiment disclosed herein one series of keys is employed to control the amount differential mechanism of the machine and also to control the indicating and printing of words or characters to identify the classes of transactions and the clerks making the particular transactions.

It is a further object of this invention to provide means controlled by the keys representing credit transactions or a "no sale" for disabling the mechanism for establishing operative relation between the totalizer and the actuating mechanism so that when one of these keys is operated to represent a transaction or a "no sale" the amount set up by the keys will not be entered in the totalizer.

A still further object of this invention is to provide a novel form of escapement mechanism for positively moving the item wheels into position to be operated by the keys and into operative relation with the differential mechanism of the machine.

To construct novel mechanism for positioning the indicating mechanism under the control of the keys and to provide means for concealing the indication when one of the keys is operated in a certain order were also objects of the invention.

With these and incidental objects in view, the invention consists in certain novel features of construction and combinations of parts the essential elements of which are set forth in appended claims, and a preferred form of embodiment of which is hereinafter described with reference to the drawings which accompany and form part of the specification.

Of said drawings:—

Figures 1 and 2 combined constitute a front elevation of the entire machine embodying the present invention, the cabinet being removed to expose the mechanism of the machine to view.

Fig. 3 is a detail view of the portion of the cabinet of the machine provided with sight openings through which the items set up on the item wheels can be viewed.

Fig. 4 is a detail top plan view of the machine with the indicator tablet carrying frames, the printing mechanism and the totalizing mechanism broken away.

Fig. 5 is a transverse vertical section taken on the line A—A of Figs. 1 and 4.

Fig. 6 is a detail view of the mechanism employed to restore the item wheels to zero position.

Fig. 7 is a transverse vertical section taken on the line B—B of Figs. 2 and 4.

Fig. 8 is a detail view of the device employed to shift the item wheels to normal position.

Fig. 9 is a detail view in rear elevation of the indicating mechanism.

Fig. 10 is a detail transverse sectional view taken through the item wheels.

Fig. 11 is a detail top plan view of the device for locking the item wheels against rotation during the shifting movement of the item wheels.

Fig. 12 is a detail view of the cam and arm for operating the means shown in Figs. 5 and 6 for restoring the item wheels to zero position.

Fig. 13 is a detail view of the "full stroke" device employed to prevent backward rotation of the operating mechanism.

Fig. 14 is a detail view in perspective of a part of the "no sale" indicator tablet.

Fig. 15 is a detail transverse sectional view through the sleeves and the segment gears operated by the item wheels.

Fig. 16 shows a part of the detail strip printed by the machine.

Fig. 17 is a detail side view of part of the mechanism for shifting the item wheels upon operation of the keys.

Fig. 17ª is a detail view of several of the locking devices for preventing the simultaneous operation of two keys.

Fig. 18 is a transverse vertical section through the machine showing the printing and totalizing mechanisms, the section being taken on the line C—C in Fig. 1.

Fig. 19 is a detail view in front elevation of the totalizing mechanism.

Figs. 20 and 21 are detail views of the transfer mechanism. Fig. 20 shows the position of a transfer device when the totalizer wheel is in engagement with the actuator and Fig. 21 shows the position of the transfer device after the totalizer wheel is moved out of engagement with the actuator and before the transfer is completed.

Fig. 22 is a detail transverse sectional view through the type carriers and their sleeves.

In the present form of embodiment shown in the drawings, ten amount keys are provided (as shown in Fig. 4). Each key represents one of the digits from "0" to "9", inclusive, and also represents a clerk's initial. Four of the keys, in addition to representing amounts and initials, represent the classes of transaction, such as "cash", "paid out", "charge", and "received on account." One of the keys also represents a "no sale" key. It will be obvious from the description which is to follow that more of the keys may be employed to represent classes of transactions such as "C. O. D.", "bills due", "goods delivered", etc.

The keys are so constructed as to operate differentially a single actuator from normal position, the extent of each movement of the actuator being commensurate to the value represented by the key operated. The extents of movement of the actuator are imparted to item wheels which, through escapement mechanism controlled by the keys are successively shifted into and then beyond operative relation with the actuator. As the item wheels are shifted beyond operative relation with the actuator they are shifted into operative relation with segment gears connected to the indicating mechanism, and to the type wheels. There are as many segment gears as there are item wheels and upon each operation of a key each of the item wheels, which have been moved differentially by the preceding operations of keys, is shifted out of engagement with one segment gear and into engagement with the next segment gear.

Upon an operation of the main operating mechanism the item wheels are rotated to zero position to impart their differential movement to the segment gears. After the item wheels are rotated to zero position they are shifted back to normal position by a shifting cam. The last key depressed, through the item wheel in operative relation with the actuator during the operation of the key, controls the indicating mechanism and the type wheel for indicating and printing characters representing the class of transaction and the second from the last key depressed controls the indicating mechanism and the type carrier for indicating and printing the clerk's initial. The keys depressed before the last two keys, through the item wheels controlled thereby, control the indicating mechanism, and the amount type carriers for indicating and printing amounts.

The amount type carriers also actuate the totalizer. If any one of the keys representing a "paid out" or "charge" transaction or a "no sale" is the last key operated the totalizer engaging mechanism is automatically disabled thereby, if it is not already disabled so that the amounts set up on the amount type carriers will not be registered on the totalizer.

*Operating mechanism.*

The machine is operated by means of a crank handle 25 (Fig. 2) loosely mounted on a stud projecting from the right hand frame of the machine. A pinion 26, rigid with the crank handle 25, meshes with an intermediate pinion 27 of the same size and the latter pinion in turn meshes with a gear 28 rigidly mounted on a main drive shaft 29, which at its right hand end is journaled in a frame 23 and at its left hand end in a frame 24 (Fig. 1). The pitch lines of these pinions 26 and 27 and the gear 28 are indicated by the dot-dash lines in Fig. 7. The gear wheel 28 is twice as large as each of the pinions 26 and 27 so that it is necessary to give the crank handle two complete rotations to impart one rotation to the main drive shaft at each operation of the machine.

In order to prevent the crank handle from being rotated backwardly the following described frictional device is employed. The gear 28 has a circular groove 30 (Fig. 13) formed in its right hand face. As this groove 30 extends nearly through the gear the latter is strengthened by a disk 31 (Figs. 2 and 13) which is rigidly connected to or integral with the gear. An arm 32 is loosely mounted at its lower end on a stud 38 projecting from the right hand frame 23 of the machine and at its upper end the arm has a flange 33 projecting into the groove 30. A roller 34 is positioned between the flange 33 and the outer circular surface of the groove 30 the roller being held in engagement with the flange and this surface by a plunger pin 35 slidably mounted in a projection 36 on the arm 32 and normally held against the roller by a spring 37 coiled about the plunger pin. The flange 33 rests on the inner circular surface of the groove 30. It can be seen from the above description that when the gear 28 is rotated in the direction of the arrow shown in Fig. 13 the roller does not frictionally connect the arm 32 and the gear and, therefore, the gear can be rotated in this direction by the crank handle to operate the machine. However, if it should be attempted to rotate the gear wheel backwardly, that is, in the direction opposite to that indicated by the arrow, the roller would be wedged tightly between the flange 33 and the outer cylindrical surface of the groove 30 thereby frictionally connecting the gear wheel and arm 32 to prevent such rotation.

*Key-board.*

As above stated, the machine is provided with ten keys 40 (Figs. 1, 2, 4, 5, 7 and 18) which are in the form of levers. As shown in Fig. 4, the key label on each key carries the digit and the clerk's initial represented by the key. The labels of the "0", "1", "2", and "3" keys also carry characters or words representing "cash", "paid out", "charge", and "received on account" transactions respectively and the label of the "9" key carries the words "No sale". All of the keys are pivoted on the main drive shaft 29 and near their forward ends pass through slots 41 (Fig. 7) formed in the cabinet of the machine, the slots being provided to permit operation of and guide the keys. Springs 42, which are connected at their rear ends to downwardly extending arms 43 of the key levers and at their forward ends to a cross rod 44, normally serve to retain the keys in the normal position shown in the drawings and also to restore the keys to such position after they have been depressed.

Each key is provided with a slot 46 and a rod 47 projects through these slots and is normally in the position shown in Figs. 5 and 7. The rod 47 is supported at its ends by two arms 48 (Figs. 1, 2, 4, 5 and 7) loosely mounted on a cross rod 49. All of the rearwardly (and nearly longitudinally) extending portions of the slots 46 are alike, and are concentric with the shaft 49. The upwardly and rearwardly extending portions of these slots, however, are differentially inclined rearwardly the extent of inclination being proportional to the digits represented by the keys. The upwardly extending portion of the slot 46 in the zero key (see Fig. 5) is concentric with the main drive shaft 29 so that when the zero key is depressed the rod 47 is not moved rearwardly. However, when any other key is operated the rod 47 is moved rearwardly a number of steps corresponding to the value represented by the key, the arms 48 being swung counter clockwise about the cross rod 49. For example, if the "1" key is depressed the rod 47 is moved one step. If the "2" key is depressed the rod is moved two steps and so on, the "9" key being adapted to move the rod nine steps. A lever 50, having a segmental rack portion 51 at its upper end, is loosely mounted on the cross rod 49 and has a forwardly projecting portion 52 (Figs. 1, 4 and 5) through which the rod 47 passes so that the movement imparted to the rod 47 by the keys is also imparted to the lever 50 which will be called herein the "actuator". The actuator 50 has an arm 53 extending downwardly from the cross rod 49 and connected to a spring 54 serving to retain the actuator 50, the rod 47, and the supporting arms 48 in their normal position and to return them to such position after they have been moved differentially by a key. When any but the zero key is depressed it can be seen that the rod 47 is moved into the rearwardly extending portions of the slots 46 in the undepressed keys whereby the undepressed keys are locked against operation.

In order to prevent the simultaneous depression of two or more keys a well known form of locking devices 400 (Figs. 5, 7 and 17ᵃ) is provided. These devices are in the form of arms pivoted on the cabinet of the machine, there being one arm for each key. When a key is depressed it separates and moves between the upper ends of two of the arms and the movement of the arms is limited so that but one key can move between them at a time as is well known in the art; whereby two keys cannot be depressed simultaneously.

For the purpose of preventing operation of the machine during the operation of a key and also to prevent operation of a key after the operation of the machine has begun and for further locking all unoperated keys while one key is being operated, the following described locking mechanism is provided. A rod 57 is supported near its ends by two arms 58 (Figs. 1, 2 and 5) loosely mounted on a cross rod 59 mounted in the frame of the machine. The rod 57 extends through the upwardly and forwardly extending arm of a lever 60 (Figs. 2 and 7) also loose on the cross rod 59. The rearwardly extending arm of the lever 60 carries a pin 61 which is normally opposite or below the entrance to a slot 62 (Fig. 7) formed in a disk 63 fast on the main drive shaft 29. The rod 57 projects through angular slots 64 also formed in the keys. The lower portions of the slots 64 are concentric with the cross rod 59 and the upper portions of the slots 64 are straight and inclined forwardly and upwardly so that when a key is depressed the rod 57 is forced downwardly as the upper end of the slot 64 in the depressed key moves down over the rod. As the lower portions of the slots 64 are concentric with the rod 59 it can be seen that the rod 57 moves idly in these portions of the slots in the undepressed keys and therefore such movement of the rod would also prevent operation of a second key while one key is out of normal position. Movement of the rod 57 in this manner rocks the lever 60 clockwise (Fig. 7) thereby raising the pin 61 into the slot 62 which is also concentric with the rod 59. It will readily be seen that the pin 61 will remain in the slot 62 as long as any one of the keys is out of normal position. Movement of the pin 61 in the slot 62 prevents rotation of the disk 63 and hence operation of the machine while a key is out of normal position. During the operation of the machine the slot 62 is carried away from over the pin 61 and, therefore, a key cannot be depressed during an operation of the machine as the pin 61 upon such attempted operation of a key would engage the solid periphery of the disk 63.

The rod 57 is preferably formed with two adjoining flat surfaces substantially at right angles, the apex formed by said surfaces being adapted to coöperate with the apex formed by the forward walls of the slot 64 so as to form a close locking point to lock all remaining keys as soon as any one of the series is slightly depressed.

A spring 65 (Fig. 7) connected at one end to the rod 57 and at its opposite end to the machine frame, normally serves to retain the rod 57, its supporting arms 58 and the lever 60 in normal position and assists the depressed key to restore these parts to normal position during the upstroke of the key.

*Item wheels.*

The differential movement of the actuator 50 upon depression of a key, is imparted to one of a plurality of item wheels 66 (Figs. 1, 2, 4, 5 and 6) during the differential movement of the actuator from normal position. For the sake of illustration only five item wheels are shown, and each wheel is provided with teeth 67 over a portion of its periphery and the remaining portion of the periphery is provided with a flange 68. As shown in Figs. 1 and 4, the flanges of the first four item wheels counting from the left have the digits "0" to "9" inclusive consecutively arranged thereon and the flanges on the second, third, and fourth item wheels also have characters representing the classes of transactions and "no sale," while the periphery of the fifth or last item wheel counting from the left is provided only with characters representing the classes of transactions and "no sale." The item wheels are loose on a sleeve 70 (Figs. 4 and 10) slidably mounted on a cross rod 71, which is supported at its right hand end in the frame 23 and at its left hand end in an upright frame 168. Spacing collars 72 placed between the adjacent item wheels, a collar 73, mounted on the left hand end of the sleeve 70, and a collar 74, fastened to the right hand end of the sleeve by a screw 75, serve to prevent longitudinal movement of the item wheels relative to each other and to the sleeve 70.

The item wheels are normally in zero position (Fig. 5). Upon depression of the keys the sleeve 70 with the item wheels is moved step by step toward the left side of the machine to move the item wheels successively into and out of engagement with the segmental gear portion 51 of the actuator 50. Considering all parts in normal position, during the initial portion of the downstroke of a key the item wheels are shifted one-half step to move the left hand one of them into engagement with the actuator, so that during differential movement of the actuator from normal position upon continued depression of the key, this movement of the actuator is imparted to the item wheel in engagement therewith and then near the end of the downstroke of the key the item wheels are shifted one-half step farther to move the actuated item wheel out of engagement with the actuator.

The lower ends of the upwardly extending portions of the slot 46 (Figs. 5 and 7) in the keys are formed with a "dwell" so that during the initial portion of the downstroke of a key, at which time the adding wheels are shifted one-half step, the rod 47 and, therefore, the actuator 50 is not moved and the upper ends of these portions of the slots are also formed with a "dwell" so that near the end of the down stroke of a key, at which time the item wheels are shifted another half step, the rod 47 and therefore the actuator is not moved. It can, therefore, be seen that the upwardly extending portions of the slots 46 are so formed that the actuator 50 is rocked differentially only during the central portion of the downstroke of the key at which time one of the item wheels 66 is in engagement with the actuator.

*Item wheel shifting mechanism.*

The means for shifting the item wheels 66 will now be described. A bar 78 (Fig. 2) has a series of teeth 79 formed in its upper edge and a series of teeth 80 formed in its lower edge and is rigidly connected near its left hand end by the screw 75 (Figs. 2, 4 and 10) to the sleeve 70 and at its right hand end the bar is rigidly connected to a member 81 (Figs. 2, 4 and 7) loosely mounted on a sleeve 82 surrounding the cross bar 71. A lever 84 (Figs. 2, 7 and 17) is loosely mounted on the cross rod 59 and has a forwardly extending projection 87 (Fig. 7) through which the rod 57 extends. The lever 84 at its upper end carries integral therewith a curved plate or flange 85 which is concentric with the shaft 59. The plate 85 is provided with the cam ridge 86, a top plan view of which is shown in Fig. 4. This cam ridge 86 engages between the teeth 80 on the bar 78 as shown in Fig. 2. During the initial portion of the down stroke of the key, at which time it will be remembered the actuator is not moved, the forward cam portion 88 (Fig. 4) of the cam ridge 86 moves between two teeth 80 on the bar 78 and thereby shifts the bar 78, the sleeve 70 and the item wheels one-half step toward the left so that the teeth on one of the item wheels are moved into engagement with the teeth on the actuator 50. It will be seen that the lever 84 is rocked forwardly an invariable extent upon each depression of the key and then returned to normal position as the rod 57, which is operated an invariable distance by the keys, passes through the projection 87 (Fig. 7) of the lever 84 as above stated. As the central portion 89 of the cam ridge 86 passes between the teeth 80 the item wheels are not shifted and during this time the actuator is being moved differentially by the key so that the item wheel in engagement therewith is moved a like extent. Finally after the actuator has been moved differentially and during the end of the downstroke of the key the camming portion 90 of the ridge 86 moves between the teeth 80 and shifts the item wheels another half step so that none of the item wheels are in engagement with the actuator during the return movement of the latter to normal position.

Near the end of the forward stroke of the lever 84 the rack bar 78 is raised so that during the return movement of the lever 84, which is effected upon the upstroke of the operated key, the cam ridge 86 will be out of engagement with the teeth of the bar and hence will not shift the item wheels toward the right (Figs. 1 and 2). To this end an arm or disk 93 (Fig. 17) is fast to the sleeve 82 on the cross rod 71. Also rigidly mounted on the sleeve 82 is an arm 94 having a flange 95 normally in such a position that when the lever 84 is swung forwardly the plate 85 on the lever 84 moves over the flange 95. An arm 96 is also fast on the sleeve 82 and supports the left hand end of a cross rod 97 which at its opposite end is supported by an arm 98 (Figs. 2, 4 and 7) fast on the sleeve 82. The rod 97 passes through the member 81 the latter being free to move longitudinally of the rod 97 and the sleeve 82. The disk 93 carries a projection 99 (Fig. 17) which projects into a slot 100 (Fig. 4) formed in the plate 85. Near the end of the forward stroke of the lever 84 the rear end of the slot 100 engages the projection 99 and rocks the disk 93, and therefore the sleeve 82 and the arms 94, 96 and 98, fast upon the sleeve, counter clockwise as viewed in Fig. 7. In this manner the rod 97 is swung rearwardly and as this rod passes through the member 81 the latter is also rocked with the sleeve 82 thereby raising the rack bar 78 out of engagement with the camming ridge 86.

The arm 98 has two notches 104 (Fig. 7) formed in its upper end and in the rear notch normally engages the nose of a pivoted pawl 105 operated by a spring plunger 106 mounted in a lug 107 on the frame of the machine. It can be seen that when the bar 78 is raised the pawl engages in the forward notch 104 to retain the bar in elevated position during the return movement of the lever 84. Near the end of the return movement of the lever 84 to normal position the forward end of the slot 100 engages the projection 99 of the disk 93 thereby rocking the disk 93, and arms 96, 98 and 81 to normal position to lower the bar 78 to normal position in which position the cam ridge 86 engages between two teeth 80 on the bar. When the rack bar 78 is raised near the end of the forward stroke of the lever 84, as above described, an edge 101 (Fig. 7) of an alining arm 102 engages between the teeth 79 of the rack bar and thereby prevents any accidental shifting of the rack bar and the item wheels during the return movement of the lever 84 to normal position. The arm 94 is rocked counter clockwise (Fig. 7) with the sleeve 82 when the rack 78 is raised so that during the return movement of the lever 84 to normal position the flange 95 of the arm 94 is over the plate 85 of the lever 84 positively to lock the rack bar 78 in its elevated position. When the forward end of the slot 100 upon return movement of the lever 84 to normal position engages the projection 99 of the disk 93 the plate 85 has moved from under the flange 95 on the arm 94 so that the movement of the bar 78 to normal position is permitted. As shown in Fig. 4 the left hand side of the plate 85 is cut away at its rear end to permit movement of the flange 95 to normal position.

For the purpose of compelling the complete depression of a key after it has been depressed partially the arm 96 has a downwardly extending tooth 109 (Fig. 17) which engages the plate 85 on the lever 84. The tooth 109 normally engages the plate 85 at a point in front of a perpendicular line through the axis of the cross rod 71 so that the plate 85 can normally move forwardly. However, after such forward movement is begun and before it is completed the lever 84 can not be moved back to normal position because such attempted return movement would wedge the tooth 109 firmly against the plate 85 and hence prevent the movement. It is obvious that since the lever 84 can not be moved rearwardly until it has completed its forward movement the keys which move the lever 84 must be depressed completely before they can be returned to normal position. At the end of the forward movement of the lever 84 the arm 96 is rocked clockwise, (Fig. 17) as above described, so that during the return movement of the lever the tooth 109 is out of engagement with the plate 85.

During the operation of the machine the item wheels 66 are shifted toward the right to normal position by a shifting lever 111 (Figs. 2, 4, 7 and 8) having a cam ridge 112 for coöperating with a roller 113 (Figs. 2 and 4) mounted on the member 81. The lever 111 is rocked forwardly during each operation of the machine and the right side of the cam ridge 112 engages the roller 113 at any position in which the roller may be and thereby shifts the member 81, the rack bar 78, the sleeve 70, and the item wheels mounted on the sleeve 70 to normal position. The lever 111 is loosely mounted on the cross rod 59 and is rigidly connected at 114 to a member 115 (Fig. 8) also loosely mounted on cross rod 59. The member 115 carries a pair of rollers 116 and 118 engaging the peripheries of a pair of cams 117 and 119 respectively fast on the drive shaft 29. These cams 117 and 119 are so constructed that after the item wheels are rotated to zero, as will be described later, the lever 111 is rocked clockwise, as viewed in Figs. 7 and 8, to shift the item wheels to normal position as above stated, the lever 111 then being moved back to normal position.

As the rack bar 78 is returned into engagement with the cam ridge 86 on the lever 84, upon each operation of a key, it is in engagement therewith at the beginning of the operation of the machine. It is, therefore, necessary to elevate this rack bar out of engagement with the cam ridge 86 to permit the shifting of the rack bar and item wheels to normal position. The alining arm 102 (Fig. 7) is designed to perform this function. This arm is loosely mounted on the cross rod 59 and has a rearwardly projecting portion 121 carrying a roller 122 which projects into a cam groove 123 formed in the face of a disk 124 fast on the drive shaft 29. The cam groove 123 is so designed that near the beginning of the operation of the machine the arm 102 is rocked counter clockwise (Fig. 7) so that its shoulder 125 engages the cross rod 97 to move the latter rearwardly whereby the rack bar 78 is raised so that the latter and the item wheels may be shifted to normal position. Near the end of the operation of the machine the arm 102 is rocked clockwise past normal position and then counter clockwise to normal position and during its clockwise movement its shoulder 126 engages the cross rod 97 to swing the latter to normal position thereby moving the rack bar 78 into engagement with the cam ridge 86. When the rod 97 is moved rearwardly during the operation of the machine as above described, the lever 84 is moved slightly clockwise (Fig. 7) by the movement of the arm 93 because of the engagement of the projection 99 with the forward end of the slot 100, whereby the lever 60 is moved slightly clockwise. The periphery of the disk 63 is cut away slightly at 120 to permit this movement of the lever 60 the pin 61 on the lever 60 being adjacent this portion of the periphery of the disk 63 when the lever is rocked.

As the item wheels are shifted step by step upon operation of the machine they display the characters or digits corresponding to the keys actuating the item wheels through sight openings 128 (Fig. 3) formed in the cabinet of the machine. Part of the right hand sight opening is covered with colored transparent glass or celluloid 128ᵃ. As each item wheel is shifted after being actuated it moves behind the right hand sight opening and then upon operation of the item wheels to the right it moves successively behind the sight openings to the left. In Fig. 3 the item wheels show that there has been five depressions of keys. The "5" key was first depressed to represent $5; the "6" key was then depressed to represent 60 cents and the "5" key was again depressed to represent 5 cents, the total amount represented by the depressed keys being $5.65. The "7" key was then depressed to represent that the clerk, to whom the initial "M" was assigned, made the transaction. Finally the "3" key was operated to represent that $5.65 was received on account, as the character displayed through the uncovered portion of the right hand sight opening indicates the class of the transaction. The first four sight openings 128, counting from the left, are equi-distant apart so that the digits on the item wheels are displayed through them. The uncovered portion of the right hand sight opening, however, is a greater distance from the sight opening, through which the number corresponding to the clerk's initial is indicated so that the characters representing the classes of transactions are displayed through the uncovered portion of this right hand sight opening.

It can be seen that the right hand item wheel is not provided with digits as this wheel is only designed to indicate the classes of transactions. The second, third, and fourth wheels, however, have digits and characters so that if there are less than five but more than one key depressed the item wheel last actuated by the actuator displays a character through the right hand sight opening to indicate the class of transaction. After each digit of an amount or a digit representing the clerk is set up it can be seen through the colored glass or celluloid 128ª covering a portion of the right hand sight opening.

After an item wheel is actuated by the actuator 50 it is shifted one-half step toward the left, as above described, such shifting movement being designed to move the item wheel into engagement with the right hand one of five segment gears 130 (Figs. 1, 4, and 15). Then, as each following item wheel is actuated each of the item wheels previously actuated is moved successively into engagement with the segment gears to the left of the right hand segment gear. From this it can be seen that if there has been five depressions of keys all of the item wheels engage the segment gears 130. If less than five keys have been operated only those item wheels operated differentially are in mesh with a corresponding number of segment gears. It will be remembered that the item wheel operated by the last key depressed indicates the class of transaction represented by the key and as this item wheel at the beginning of the operation of the machine is in mesh with the right hand segment gear 130 the latter will be called the transaction segment gear herein. The second segment gear from the right at the beginning of the operation of the machine meshes with the item wheel indicating the numeral corresponding to the clerk's initial and therefore the segment gear will be called the clerk's segment gear. The third, fourth, and fifth segment gears counting from the right are the units, tens and hundreds segment gears respectively.

In order to lock the item wheels against rotation when they are out of engagement with either the actuator 50 or the segment gears 130 during their shifting movement a frame 132 (Figs. 4, 5 and 11) is provided with teeth 133 arranged in a straight row below the item wheels and parallel with the cross rod 71. The frame 132 is mounted on a cross rod 134 and a shaft 135. The right hand tooth 133 is long, so as to form a ridge engaging between teeth on all of the item wheels when the latter are in normal position. As an item wheel is shifted into engagement with the actuator 50 it slides out of engagement with this long tooth. The frame 132, as shown in Fig. 11, has a slot 137 through which the actuator moves. As an item wheel is shifted out of engagement with the actuator and into engagement with the right hand segment gear 130 it engages the small tooth immediately to the left of the slot 137 and as it moves into engagement with the right hand segment gear 130 it passes out of engagement with this tooth. Then as the item wheel is shifted out of engagement with one segment gear 130 into engagement with the next segment gear, the tooth between the segment gears engages the item wheel to lock it against rotation during its shifting movement. In this manner the item wheels are locked against rotation except when they are in engagement with the actuator or with the segment gears 130.

*Printing mechanism.*

The segment gears 130 are fast on nested sleeves 140 (Figs. 4, 5, 6 and 15) surrounding a cross rod 141. As best shown in Fig. 15 the units, tens and hundreds segment gears are fast to the right hand ends of the three outermost sleeves 140. The clerk's segment gear is rigidly mounted on the innermost sleeve 140 and the transaction segment gear is fast on a sleeve 143 to which the right hand end of a yoke 142 is also fast. The left hand end of the yoke is rigidly mounted on the right hand end of the second sleeve from the cross rod 141. The left hand ends of the sleeves 140 rigidly carry segment gears 145 (Figs. 1, 4, 5, 15 and 22) which mesh with segment gears 146 rigidly mounted on the right hand ends of sleeves 147 surrounding the cross rod 71. The sleeves 147 at their left hand ends carry type wheels 148 (Figs. 4, 18 and 22). The type wheels have flanges 149 carrying the printing type and a portion of the three left hand or amount type carriers are provided with teeth 150. The type carriers are normally in zero position and have imparted thereto the differential movement of the item wheels in engagement with the segment gears 130 appropriate to the type wheels when the item wheels are rotated counter-clockwise (Figs. 5 and 6) to zero position by the following described mechanism. It can be seen that the second type carrier 180 from the right prints characters representing the class of transaction as this type carrier through its sleeve 147, segment gears 146, and 145, sleeve 140, yoke 142 and sleeve 143 is connected to the transaction segment gear. The right hand type carrier is connected through the corresponding connections to the clerk's segment gear, and prints the clerk's initials, while the remaining three type carriers are connected to the amount segment gears and print amounts.

A cross rod 151 (Figs. 1, 2, 4, 5 and 6) projects through openings 152 (Fig. 6) formed in the item wheels and is supported at its ends in two segment gears 153 loose on the cross rod 71. The rod 151 is normally in engagement with the forward ends of the openings 152 so that the item wheels may be rotated clockwise (Figs. 5 and 6) by the actuator 50, as above described. The distance between the segment gears 153 is sufficient to permit the shifting movements of the item wheels. The segment gears 153 mesh with corresponding segment gears 154. The left hand segment gear 154 is loosely mounted on the outermost sleeve 140 and the right hand segment gear is loosely mounted on the sleeve 143, and the segment gears 154 are connected together by two cross rods 155 and 156, the ends of which are mounted in the segment gears. The upper end of an arm 157 (Figs. 5, 6 and 12) loosely mounted on a cross rod 158, which is carried in up-rights or standards 159 mounted on the base of the machine, is bifurcated to straddle the cross rod 156. Intermediate its ends the arm 157 is provided with a projection 163 (Fig. 12) carrying a roller 160 projecting into a cam groove 161 formed in the face of a disk 162 fast on the drive shaft 29. The cam groove 161 is so shaped as to rock the arm 157 counter clockwise (Figs. 5, 6 and 12) near the beginning of the operation of the machine whereby the segment gears 154 are rocked clockwise and the segment gears 153 counter clockwise. While the segment gears 153 are being rocked counter clockwise the rod 151 engages the rear ends of the openings 152 in the item wheels and thereby rotates them to zero position. When the item wheels are turned to zero in this manner they impart their differential movement to the segment gears 130 with which they engage, and thereby the type wheels 148 are rotated counter clockwise (Fig. 18) through the sleeves 140, segment gears 144, segment gears 145 and sleeves 147 so that their type corresponding to the keys depressed are brought to a common printing line.

The detail strip 164 on which the type carriers print is fed from a supply roll 165 (Fig. 18) over a guide stud 166 under the type carriers and around two guide studs 173 onto a storage roll 167. The supply and storage rolls and the guide studs are carried on the frame 168. No means is shown in the drawings for feeding the detail strip as any well known feeding means may be employed for this purpose and such means is not necessary to the understanding of the present invention.

An inking ribbon 169 through which the type carriers print on the detail strip is mounted on a frame 176 fast to the frame 168 and is fed over the detail strip and at right angles to the direction of feed of the detail strip by any desired means. The ribbon 169 is fed from a supply roll 171 over a guide roll 172 on each side of the detail strip, and onto a storage roll (not shown) which is similar to the supply roll 171.

A platen 174 (Figs. 4 and 18) for carrying the detail strip against the type carriers is mounted in a frame 175 (Figs. 4, 18 and 19) loosely mounted on the shaft 135. The frame 175 on its right hand side carries a stud 1761 projecting through a member 177 also loosely mounted on the shaft 135. The member 177 carries a roller 178 projecting into a cam groove 179 formed in the face of a disk 180 having teeth 181 cut in a portion of its periphery. The cam groove 179 is so formed that the member 177 is rocked first clockwise (Fig. 18) before the type wheels are moved differentially, retained in this position during the differential movement of the type wheels, then rocked counter clockwise past normal position so that the platen forces the detail strip against the type carriers and finally rocked clockwise to normal position.

After the item wheels are turned to zero, as above described, they are shifted toward the right to normal position by the cam member 111 as also described above, and then after the item wheels have been shifted to normal position and a printing impression has been taken from the type wheels the arm 157 is rocked clockwise (Figs. 5 and 6) by the cam groove 161 to move the segment gears 154 to normal position. During this return movement of the segment gears 154 the cross rod 156 engages shoulders 182 on the segment gears 130 thereby returning the segment gears 130, the sleeves 140, the segment gears 145 and 146, the sleeves 147 and the type wheels 148 to zero position. A cross rod 184 which projects through openings 185 (Fig. 6) in the item wheels and also through openings 186 in the segment gears 153, is mounted on its left hand end in a plate 187 (Figs. 1, 4 and 5) supported by the shaft 135 and the cross rod 71, and the right hand end of this rod is mounted in the right hand frame 23 of the machine. This rod normally engages the upper or rear ends of slots 185 in the item wheels and it can be seen that when the item wheels are turned to zero position, this rod will serve as a positive stop to prevent movement of the item wheels past such position. A cross rod 190 serves as a positive stop for the segment gears 154, these segment gears having projections 191 which engage the rod 190 when the segment gears are returned to normal position. Wedge shaped noses 192 (Fig. 5) on pawls 193 loosely mounted on the cross rod 190 engage notches 194, formed in the segment gears 145, when the segment gears are in zero position, the pawls being employed to aline the segment gears 145, sleeves 140, segment gears 130, segment gears 146, sleeves 147 and type wheels 148 in normal position. The pawls 193 are operated by spring plungers 195 mounted between rearwardly extending arms 198 of the pawls and a member 196 fast to the cross rod 190. Downwardly and rearwardly extending arms 197 of the pawls 193 engage the member 196 to prevent the pawls from rocking clockwise past normal position when the segment gears 145 are moved differentially as described.

Totalizer.

The totalizer comprises six registering wheels 200 (Figs. 18 and 19) loosely mounted on a shaft 201 which is supported at its right hand end in a lever 202 loosely mounted on the shaft 135 and near its left hand end in arm 203 also loosely mounted on the shaft 135. On the lower end of the lever 202 is pivotally mounted an arm 2033 carrying a pin 204 which is adapted to engage in the recess in the lower end of the member 177. As stated hereinbefore, the cam groove 179 in the disk 180 is so constructed that the member 177 is rocked clockwise (Fig. 18) before the type carriers 148 are moved differentially and is retained in moved position during differential movement of the type carriers. It can be seen that upon this clockwise movement of the member 177 the lever 202 will also be rocked clockwise through the arm 2033 thereby rocking the totalizer to engage pinions 205 rigid with the units, tens and hundreds registering wheels with the teeth 150 on the amount type carriers 148 so that the movement imparted to these type carriers is imparted to the totalizer wheels. The three left hand registering wheels are operated by transfer mechanism when amounts are carried from the hundreds registering wheel as will be described later. After the totalizer has been actuated and before the type carriers begin their return movement to normal position the member 177 is rocked counter clockwise, as above stated, and therefore the totalizer is moved out of engagement with the amount type carriers at this time.

In order to prevent the registering wheels from being actuated when the 1, 2, or 9 key is the last key operated, the arm 2033 is rocked clockwise (Fig. 18) by depression of the key so that the pin 204 on the arm 2033 is moved out of engagement with the bifurcated end of the member 177 whereby when the member 177 is rocked the totalizer will not be moved into engagement with the teeth on the amount type carriers. It is obvious that as the "1" and "2" keys represent "paid out" and "charge" transactions respectively, it is not desirable to enter the amounts of such transactions on the totalizer. The "9" or "no sale" key is depressed when the operator has discovered that he has depressed in error keys representing an incorrect amount or initial, and, therefore, when this key is the last key depressed the amount set up on the type carriers should not be entered on the totalizer. After the "9" key is operated to represent a "no sale" the machine is operated in the usual manner. Before he has depressed the last key to represent the class of the transaction the operator can see if he has depressed the proper keys to represent the amount or initial, as the last digit of the amount set up on the item wheels can be viewed through the second sight opening 128 from the right, and at the same time the digits in the denominations of higher order can be viewed through the third and fourth sight openings and the digit representing the clerk can be seen under the colored glass or celluloid covering a portion of the right hand sight opening. The connections for disabling the above described means for rocking the totalizer into engagement will now be described.

The arm 2033 has a slot 206 into which a pin 207 (Figs. 1, 4, 18, and 19) carried by the forward end of an arm 208 projects. The arm 208 is rigidly mounted on a shaft 209 journaled in the standards 159. Immediately to the right of the left hand standard 159 is an arm 210 (Figs. 4 and 5) also fast on the shaft 209 and a similar arm 210 (Figs. 4 and 7) is mounted on the shaft 209 near its right hand end and supported by the forward ends of the arms 210 is a cross rod 211. The lower ends of the downwardly extending arms 43 of the 1, 2, and 9 keys have rearwardly extending projections 212 (Fig. 5) which project over the rod 211 and the downwardly extending arms 43 of the "0" and "3" keys are provided with rearwardly extending projections 213 which project under the rod 211. From the above construction it can be seen that when the "1," "2" or "9" key is depressed the lower inclined edge of the projection 212 on the key engages the rod 211 and moves it downwardly, thereby swinging the arms 210 and the shaft 209 clockwise, as viewed in Fig. 5. Of course, if the rod 211 is already in lowered position the operation of one of these keys will not effect movement of the rod. When the "0" or "3" key is depressed the upper inclined edge of its projection 213 engages the rod 211 and raises it if it is not already in elevated position. As the arm 208 (Fig. 18) is fast on the shaft 209 the arm 208 and, therefore, the arm 2033 is rocked clockwise to move the pin 204 out of engagement with the bifurcated end of the member 177 when the "1," "2" or "9" key is depressed and when the "0" or "3" key is depressed the arms 2033 and 208 are rocked counter clockwise to move the pin 204 into engagement with the bifurcated end of the member 177. Therefore, the arm 2033 is raised, if it is not already in raised position, every time the "0" or "3" key is depressed and the arm is lowered, if it is not already in lowered position, every time the "1," "2" or "9" key is depressed, but as one of these keys is always the last key depressed it can be seen that the last key depressed always determines whether the totalizer will be engaged with the teeth on the amount type carriers or not.

When the arm 2033 is rocked clockwise (Fig. 18) the pin 204 is moved out of the bifurcated end of the member 177 and into an inclined slot 215 formed in a vertical plate 216 mounted on the base of the machine. When the arm 2033 is rocked clockwise the pin 204 engages a point 217 formed by the rear side of the slot 215 and the upper edge of the plate 216, thereby rocking the totalizer frame counter clockwise against the tension of springs 218 which will be described later. The slot 215 is inclined rearwardly so that as the pin moves down in the slot the springs 218 rock the totalizer frame to normal position. In this manner the slot 215 and pin 204 serves to hold the arm 2033 in its elevated and lowered positions. A counter weight 219 mounted on an arm 220 fast to the shaft 209 is also employed to assist in holding the arm 2033 in one or the other of its positions.

The totalizer also includes transfer mechanism for carrying amounts from one register wheel to the register wheel of next higher order. The transfer mechanism disclosed herein is similar to that shown and described in United States Letters Patent, No. 915,090, granted March 16, 1909 to Frederick L. Fuller and therefore it need be described here but briefly. Upon a shaft 222 (Figs. 18 to 21 inclusive) mounted in the arm 203 and the lever 202 are loosely mounted sleeves 223, one for each of the registering wheels except that of highest order. Each of these sleeves is provided with a star wheel 224 and with a star wheel 225, both rigid with the sleeve. The star wheel 224 is adapted to be rotated by a pin 232 projecting from a register wheel while the star wheel 225 is adapted to be engaged by a cam 226 on a shaft 227 and when so rotated to engage the pinion 205 on the registering wheel of next higher order so as to rotate the latter one step. The shaft 227 is provided with five cams 226, one for each of the star wheels 225. The star wheel 224 has four teeth and the star wheel 225 a like number of teeth, while a disk 221 fast on the sleeve 223 is provided circumferentially with four pairs of notches 228 adapted to be engaged by projections 229 on detents 230. The detents 230 are loosely mounted on the shaft 135 and are connected by the springs 218 to arms 231 which are pivotally mounted on the cross rod 190 and serve to prevent overthrow of and accurately position the registering wheels. While a register wheel is being moved to or beyond its zero position the pin 232 will engage that tooth on the star wheel 224 which then happens to be in its path of movement and rotate the star wheel, the sleeve 223, and the star wheel 225 so that a tooth on the star wheel 225 is in the path of movement of its cam 226, the projection 229 on the corresponding detent then being in engagement with the rear notch of one of the pairs of notches 228 in the disk 221 on the sleeve. When the shaft 227 is rotated clockwise (Fig. 18) as will be later described, the cams 226 will engage the star wheels 225 which have been rotated by the totalizer pinions to rotate further the sleeves and their star wheels the balance of a quarter rotation with the result that the next following tooth of the star wheel 225 will engage the pinion 205 of the register wheel of next higher order and thus rotate the latter a distance equal to one step. The five cams 226 are arranged spirally on the shaft 227 so that when this shaft is rotated the cams will operate successively as is well known in the art.

For the purpose of rotating the cams 226 the shaft 227 upon which the cams are rigidly mounted carries a pinion 235 (Fig. 18) for coöperating with the disk 180. One of the teeth of the pinion 235 has been cut away and the two teeth on either side of this cut away tooth normally engage the solid periphery of this disk 180 so that the shaft 227 is locked against rotation while the totalizer is in engagement with the teeth on the amount type carriers 148. After the totalizer is rocked out of engagement with the teeth on these type carriers the teeth 181 on the disk 180 engage the teeth on the pinion 235, thereby giving the shaft 227 one complete rotation.

In order to prevent overthrow of the register wheels when they are moved one step by the corresponding star wheels 225 the alining or escapement arms 231 have downwardly extending projections 240. When a star wheel 225 is moved by its cam 226 it engages the projection 240 on the corresponding arm 231 thereby rocking the arm 231 clockwise (Fig. 18) to move the nose 241 on the arm between the tooth moved under the nose during the one step of movement of the pinion 205 rigid with the wheel and the next succeeding tooth so that the registering wheel can move but one step. As the tooth on the star wheel 235 moves out of engagement with the projection 240 the spring 218 restores the arm 231 to normal position thereby moving the nose 241 out of engagement with the pinion 205.

Interposed between the registering wheels and the shaft 201, upon which the wheels are mounted, are pawls (not shown) suitable to pick up the wheels at the different points at which they may be standing and return them to zero position when the shaft 201 is turned in the direction in which the registering wheels are rotated during a registering operation. The shaft has a knob 245 on its left hand end by which the proprietor may rotate the shaft to reset the register wheels to zero position whenever desired.

*Indicating mechanism.*

Five groups of indicator tablets 250 (Figs. 1, 6 and 9) are provided for indicating amounts, the first, third and fifth groups counting from the right in Fig. 1, being used to indicate hundreds, tens and units respectively at the front of the machine, and the second, third, and fourth being used to indicate hundreds, tens and units respectively at the back of the machine, as shown in Fig. 9. The indicator tablets in the third or tens group have digits on the front and rear faces so that when one of these tablets is elevated, as will be described later, the same digit for the tens denomination is shown both at the front and back of the machine. One group of five indicator tablets 251 (Figs. 2, 7 and 9) is employed to indicate the classes of transactions at the front and back of the machine and a group of indicator tablets 252 is employed to indicate the clerk's initial at the front and back of the machine. Each group of indicator tablets is carried in an individual frame 253 the tablets being vertically-slidable in internal grooves 254 (Fig. 7) formed in the sides of the frames. The frames carrying the groups of amount indicator tablets are rigidly mounted on the upper ends of arms 255 loosely mounted on the cross rod 158. The arms 255 carrying the two groups of units indicator tablets for indicating units at the back and front of the machine are rigidly connected together by a cross rod 257 (Figs. 4, 5 and 9) which is supported at its ends in rearwardly extending projections 258 on these two arms 255. The arms 255 for carrying the indicator tablets for indicating dollars or hundreds at the front of the machine and the arm carrying indicator tablets for indicating dollars or hundreds at the back of the machine are rigidly connected together by a cross bar 259 supported at its ends in projections 256 on these arms. It can, therefore, be seen that the two groups of units indicator tablets are moved as a unit and that the two groups of dollars indicator tablets also move as a unit. It is obvious that the above arrangement of the groups of amount indicator tablets is provided so that the indications at the back and front of the machine will be in correct denominational order.

The indicator tablet carrying frames 253 are positioned directly from one position to another under the control of the item wheels. This is accomplished by devices intermediate the segment gears 130 and the arms 255 carrying the frames 253 and constructed in such a way that the differential positioning of the segment gears 130 determines the positions to which the frames are to be adjusted and after the adjustment of the frames the segment gears are allowed to return to normal position without altering the position of the frames. These intermediate devices for the dollars or hundreds indicator tablets comprise a beam 260 (Figs. 1, 4 and 5) which is pivoted at its lower end to the dollars or hundreds segment gear 130 and at its opposite end to the forward end of a link 261 which at its rear end is pivoted to the upper end of an arm 262 (Figs. 4 and 9) loosely mounted on the cross rod 158. This arm 262 is like the arms 255 supporting the frames for the dollars indicating tablets and the cross rod 259 passes through a rearwardly extending projection 263 on the arm 262 so that any movement which is imparted to the arm 262 is imparted to the two groups of dollars indicator tablets. The beam 260 connected to the tens segment gear 130 is connected directly by its link 261 to the arm 255 carrying the tens indicating tablets. The beam 260 for the units segment gear 130 is connected by its link 261 to the upper end of an arm 265 loose on the cross rod 158. The arm 265 has a rearward projection 266 through which the cross rod 257 projects so that any movement imparted to the arm 265 is imparted to the two groups of units indicator tablets. The beams 260 connected to the units and tens segment gears 130 are curved intermediate their ends to fit around their hubs 268 (Figs. 1, 4 and 15) and the beam 260 for the dollars or hundreds segment gear 130 is curved to fit around the sleeve 140 upon which it is mounted. From this construction it can be seen that when the segment gears 130 are moved the lower ends of the beams 260, being pivoted to the gears, move like extents. The clockwise movement (Fig. 5) of the hundreds segment gear 130 serves to rock idly the corresponding link 261 counter clockwise around its pivotal connection with the arm 255, regardless of the position of this pivotal connection unless the indicator tablets at the beginning of the operation of the machine are in such a position that the digit on the elevated indicator tablet is lower than that to be indicated upon the operation of the machine when the positioning of the beam 260 by the segment gear 130 due to the engagement of the center of the beam with the sleeve 140 will cause the indicator frame to be swung forwardly through the link 261. The friction between the arm 255 and the cross rod 158 is sufficient to prevent movement of the arm 255 during the idle movements of its links 261. After the segment gear 130 is rocked a roller 270 on the upper end of an arm 271 is moved rearwardly by means to be described later and engages the central part of the beam 260 forcing it into engagement with the sleeve 140 unless the beam is already in engagement therewith as would be the case when the indicators are moved from a lower to a higher indicating position, as above stated. The two frames 253 carrying the units indicators and the two frames 253 carrying the tens indicators are positioned in a similar manner. There is an arm 270 and roller 271 for each of the beams 260, the beams connected to the units and tens segments 130 being forced into engagement by the rollers 271 on the movement of the indicator tablets from a lower to a higher indicating position, with hubs 268 on the units and tens segment gears 130. The lower ends of the beams 260 are, therefore, differentially set according to the differential movement of the segment gears 130 when the item wheels are turned to zero and the rollers 270 insure the center of the beam being in engagement with the sleeves 140 and 268. The beams, therefore, assume an angular position according to the keys depressed and thus through the link 261, the arm 265, and the cross rod 257, for the units indicating tablets, the link 261 for the tens indicating tablets, and the link 261, the arm 262, and the cross rod 259 for the hundreds or dollars indicating tablets, insure movement of the indicator tablet carrying frames 253 forwardly or rearwardly directly from one position to another so that the desired indicator tablets are in position to be elevated as will be described presently.

The arms 271 are rigidly mounted on the shaft 135. A rearwardly and downwardly extending arm 275 (Fig. 5) fast on the shaft 135, at its rear end carries a roller 276 which projects into a cam groove 277 formed in the face of a disk 278 fast on the main drive shaft 29. The cam groove 277 is so formed that the arms 271 are rocked counter clockwise while the segment gears 130 are in their differentially moved positions so that the rollers 270 engage the beams 260 and insure their engagement with the sleeve 140 and the hubs 268 while the segment gears are in these positions. Then before the segment gears are restored to normal position, as already described, the arms 271 are rocked forward to carry the rollers 270 away from the beams.

The carrying frame 253 for the transaction indicator tablets is mounted on the upper end of an arm 280 (Figs. 7 and 9) loose on the cross rod 158. This arm is connected by its link 261 to the corresponding beam 260 which at its lower end is pivotally connected to an arm 281 fast on the sleeve 143. As the transaction segment gear is also fast on the sleeve 143, it can be seen that the arm 281 is moved differentially as a unit with this segment gear. The frame 253 carrying the clerk's indicator tablets is rigidly mounted on the upper end of an arm 283 which is loose on the cross rod 158 and connected by its link 261 and beam 260 to an arm 285 (Figs. 4 and 15) rigidly mounted on the innermost sleeve 140 which it will be remembered rigidly carries the clerk's segment gear 130. Arms 271 carrying rollers 270 are also provided for forcing the beams 260 for the clerk and transaction indicating tablets into engagement with the hubs of the arms 281 and 285. It can, therefore, be seen that through these connections just described the clerk and transaction indicator tablet carrying frames are positioned directly from one position to another in the same manner as the frames for the amount indicator tablets are positioned.

After the indicator carrying frames have been adjusted in the manner above described, the tablets which by such adjustment have been moved into the plane where they are to be exposed are withdrawn upwardly from the frames far enough to bring their indicia to a position to be seen through sight openings 289 (Fig. 7) in the cabinet of the machine and openings 290 (Figs. 1, 7, and 9) in a shield 291 attached to the machine frames. Each of the indicator tablets has a roll shaped portion 292 formed at its top for coöperating with the vertical sides of the shield 291 to guide the indicator tablets in their upward movement.

The operating mechanism for elevating the indicator tablets comprises a plate 293 (Figs. 1, 2, 5, 7 and 9) adapted to move vertically between the vertical sides of the shield 291. This plate 293 has a number of extensions 294 having oppositely extending lugs arranged to engage selectively within notches 295 formed in the vertical edges and near the tops of the indicator tablets. The plate 293 is lowered near the beginning of each operation of the machine so as to slide the indicating tablets which are at the time in elevated position back into their normal positions in the frames 253. The plate remains in its lowered position while the frames 253 are differentially adjusted to bring the notches 295 of the desired tablet into coöperation with the lugs on the extensions 294 and the plate 293 is then returned to normal raised position carrying, by means of extensions 294, the desired indicator tablets up and holding them exposed at the end of the operation of the machine. As the elevated tablets are not lifted entirely out of the grooves 254 formed in the frames 253 the elevated tablets positively retain the frames 253 in their moved positions after the rollers 271 are carried away from engagement with the beams 266. The lifting plate 293 at each end has a tongue 300 formed at right angles to the length of the plate these tongues being secured by pins 301 to the upper ends of links 302. The lower ends of the links 302 are pivotally connected to rearward extending arms 303 of corresponding levers 304, loosely mounted on the cross rod 59. Each lever 304 carries two rollers 305 and 306 engaging the peripheries of a pair of cams 307 and 308 respectively. The two pairs of cams 307 and 308 are fast on the shaft 29 and are so shaped that near the beginning of the operation of the machine the levers 304 are rocked counter clockwise (Fig. 5) to lower the links 302 and the lifting plate 293 so that the indicator carrying frames may be moved to bring the desired tablets into coöperation with the extensions 294 on the lifting plate, after which the levers 304 are moved to normal position so that the plate 293 is elevated to its normal position whereby the desired indicator tablets are moved to exposed positions.

As shown in Fig. 2, the pin 301, pivotally connecting the right hand tongue 300 with the corresponding link 302, projects into a vertical groove 310 (shown by dotted lines) in the right hand frame of the machine and as shown in Figs. 1 and 18, a slot 311 (Fig. 18) is formed in the vertical portion of a bent frame or plate 312, supported by the shield 291 and the left hand frame of the machine, and the left hand end of the plate 293 moves in this slot, the plate 293 being guided in its vertical movements in this manner.

As already stated the "9" or "no sale" key is the last key depressed when the operator has discovered by viewing the item wheels that he has made an error in pressing the keys to represent the amount or his initial. When this key is the last key depressed the machine is operated as usual and the amount and clerk's initial is printed but the amount is not entered on the totalizer. The transaction type carrier is constructed to print characters indicating that the amount printed was not entered on the totalizer. The indicator tablets corresponding to the keys depressed are also elevated to exposed position in the same manner as upon an ordinary operation of the machine. However, when the "9" key is the last key depressed a slidable plate 315 (Figs. 1, 2, 5 and 9) is moved partially to conceal the indication at the back of the machine. This plate is provided with pins 316 and 317 which project respectively into slots 318 and 319, formed in the rear vertical wall of the shield 291 so that the plate may be slid. The plate has sight openings 313 (Fig. 9) which are the same size as and normally coincide with the sight openings 290 which are formed in the rear vertical wall of the shield 291 and through which the indication at the back of the machine can be viewed. The "no sale" indicator tablet (Fig. 14) has a projection 322 carrying a roller 323 (Figs. 9 and 14). This indicator tablet is moved into position to be elevated by the lifting plate 293 when the "9" key is the last key depressed. When this tablet is elevated its roller moves in a vertical slot 324 formed in the rear wall of the shield 291 and into an inclined slot 325 formed in the plate 315 whereby the plate 315 is slid toward the left, as viewed in Fig. 9, against the influence of a spring 320. In this manner the portions of the plate 315 between its sight openings 313 are moved in front of the digits on the elevated tablets in the dollars and tens group and the portion of the plate to the right (Fig. 9) of the sight opening through which the units are displayed is moved in front of the displayed units indicator tablet. In this way the amount on the elevated amount indicator tablets indicating at the back of the machine is partially screened to show that the operator has depressed the "9" key to represent a "no sale." At the next operation, when the "no sale" indicator tablet is lowered to normal position the roller 323 moves out of the slot 325 in the plate 315, whereupon the spring 320 restores the plate to normal position.

*Operation.*

To operate the machine the keys representing the amount to be entered on the totalizer are first depressed, then the keys representing the class of transaction and the clerk's initial respectively are depressed, and finally the crank handle is turned. Upon each operation of a key the item wheels are shifted one-half step toward the left by the escapement or shifting mechanism so that one of the item wheels is shifted one-half step into engagement with the actuator 50, moved differentially by the latter and finally shifted another half step into engagement with the transaction segment gear 130, the previously operated item wheels being shifted into engagement with the next segment gears 130 to the left of those engaged thereby at the beginning of the operation of the key.

Upon operation of the machine the item wheels are rotated to zero position by the movement of the rod 151 whereby the segment gears 130 have imparted to them the differential movement of the item wheels with which the segment gears engage. The item wheels are then shifted to the right to normal position by operation of the cam shifting member 111. The movement of the segment gears through the sleeves 140, segment gears 145 and 146, and sleeves 147 is imparted to the type wheels 148. While the type wheels are in their differentially moved position the platen frame is operated by the cam groove 179 to carry the detail strip against the type on the printing line of the type carriers so that the item is printed. The cam groove 277 (Fig. 5) rocks the arm 275, shaft 135 and the arms 271 counter clockwise to carry the rollers 270 into engagement with beams 260 in order to insure engagement of the beam 260 for the hundreds indicator tablets with the sleeves 140 of the beams 260 for the units and tens indicator tablets with the hubs of the corresponding segment gears 130, and the beams for the clerk's and transaction groups of indicator tablets with the hubs of the arms 285 and 281 respectively. In this manner the indicator carrying frames are swung directly from one position to another to bring the desired indicator tablets into operative relation with the lifting plate 293. The lifting plate 293 is then raised to elevate the selected indicators to exposed positions. The rollers 270 are then swung forwardly to normal position and finally the segment gears 130 are rotated to normal position by the movement of the cross rod 156 to normal position.

If either the "0" or the "3" key is the last key depressed to represent a "cash" or "received on account" transaction, respectively, the pin 204 (Fig. 18) is moved into engagement with the bifurcated end of the member 177 if the pin is not already in such position, the arm 2033 being rocked counter clockwise when either of these keys is depressed through the engagement of the projections 213 on the keys with the cross rod 211 carried by the arms 205 and 210 which are fast on the shaft 209 carrying the arm 208. When either of these keys is the last key depressed, therefore, clockwise movement (Fig. 18) of the member 177 is imparted through the arm 2033 to the totalizer frame to rock the totalizer into engagement with the teeth on the amount type carriers before the latter are moved differentially from normal position so that during the differential movement of these type carriers the amount set up on the item wheels will be entered on the totalizer. When the "1," "2," or "9" key is the last key depressed, however, the pin 204 is moved out of engagement with the bifurcated end of the lever 177 by the engagement of the projection 212 on the depressed key with the rod 211 if the pin 204 is not already out of engagement therewith, so that when the member 177 is rocked the totalizer will not be moved into engagement with the teeth on the amount type carriers whereby the amount set up on the type carriers and indicators will not be entered on the totalizer.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a ten key machine, the combination of item wheels adjustable to represent amounts and classes of transactions, and devices whereby said item wheels may be adjusted by a varying number of key operations to represent different amounts and classes.

2. In a ten key machine, the combination of item wheels adjustable to represent amounts and classes of transactions, and devices whereby said item wheels may be adjusted by a varying number of operations to represent amounts containing different numbers of denominational orders and the classes of transactions.

3. In a machine of the class described, the combination with a plurality of accounting devices of different classes, of keys common to said accounting devices for controlling the latter in accordance with the number and order of operations of the keys and the number of keys operated.

4. In a machine of the class described, the combination with a plurality of differentially movable accounting devices of different classes, of keys common to said accounting devices for selectively controlling the extents of differential movement of the accounting devices the particular accounting devices controlled by the operated keys being dependent upon the number and order of operations of the keys.

5. In a machine of the class described, the combination with amount indicating means, transaction indicating means and clerks' indicating means, of keys common to said indicating means, and means controlled by said keys whereby each key upon each operation thereof controls but one indicating means, the indicating means controlled by the operation of a key being dependent upon the order of operation of the keys.

6. In a machine of the class described, the combination with a plurality of accounting devices of different classes, of individual differential mechanisms for the accounting devices, keys common to said differential mechanisms, and means controlled by said keys whereby each key by each operation thereof controls but one differential mechanism the differential mechanism controlled by the operation of a key being dependent upon the order of operation of the keys and the number of keys previously operated.

7. In a machine of the class described, the combination with a series of keys each of which represents an amount, a clerk's initial, and a class of transactions, of amount differential mechanism constructed to be controlled by the keys which are depressed first to represent amounts, clerks' differential mechanism which is controlled by the key depressed after the keys representing the amount are depressed, and transaction differential mechanism controlled by the last key depressed.

8. In a machine of the class described, the combination with a series of keys each of which represents an amount, a clerk's initial, and a class of transactions, of amount differential mechanism constructed to be controlled by the keys which are depressed first to represent an amount, the number of depressions of the keys representing the amount being dependent upon the denomination of the amount, clerks' differential mechanism controlled by the key depressed after the keys representing the amount are depressed, and transaction differential mechanism controlled by the last key depressed.

9. In a machine of the class described, the combination with a series of keys each of which represents an amount and a clerk's initial, of item wheels constructed to be moved successively to different extents and shifted under control of the keys, amount differential mechanism controlled by the item wheels first moved differentially, and clerks' differential mechanism controlled by the item wheel moved differentially after those controlling the amount differential mechanism have been moved differentially.

10. In a machine of the class described, the combination with a series of keys each of which represents an amount and a clerk's initial, of item wheels constructed to be moved successively to different extents and shifted under control of the keys, amount differential mechanism controlled by the item wheels first moved differentially, the number of item wheels employed to control the amount differential mechanism being dependent upon the denomination of the amount, and clerks' differential mechanism controlled by the item wheel moved differentially after those controlling the amount differential mechanism have been moved differentially.

11. In a machine of the class described, the combination with a series of keys each of which represents an amount, a clerk's initial and a class of transactions, of item wheels constructed to be moved successively to different extents and shifted under the control of said keys, amount differential mechanism controlled by the item wheels first moved differentially, clerks' differential mechanism controlled by the item wheel moved differentially after those controlling the amount differential mechanism have been moved differentially, and transaction differential mechanism controlled by the item wheel last moved differentially.

12. In a machine of the class described, the combination with a series of keys each of which represents an amount, a clerk's initial and a class of transactions, of item wheels constructed to be moved successively to different extents and shifted under the control of said keys, amount differential mechanism controlled by the item wheels first moved differentially, the number of item wheels employed to control the amount differential mechanism being dependent upon the denomination of the amount, clerks' differential mechanism controlled by the item wheel moved differentially after those controlling the amount differential mechanism have been moved differentially, and transaction differential mechanism controlled by the last item wheel moved differentially.

13. In a machine of the class described, the combination with a series of ten keys each of which represents an amount and clerk's initial, of amount differential mechanism constructed to be controlled by the keys which are depressed first to represent the amount, the number of keys depressed depending on the number of denominational orders in the amount, and clerks' differential mechanism which is controlled by the key depressed after the keys representing the amount are depressed.

14. In a machine of the class described, the combination with a series of ten keys each of which represents an amount and a clerk's initial, of amount differential mechanism constructed to be controlled by the keys which are depressed to represent the amount the number of depressions of the keys to represent the amount being dependent upon the denomination of the amount and clerks' differential mechanism constructed to be controlled by the key depressed after the keys representing the amount are depressed.

15. In a machine of the class described, the combination with accounting devices of different classes, of differential mechanisms for the accounting devices, item wheels normally out of operative relation with the differential mechanisms, and keys and connections common to the item wheels for moving the item wheels into operative relation with the differential mechanisms and controlling the extent of rotation of the item wheels.

16. In a machine of the class described, the combination with accounting devices of different classes, of differential mechanisms therefor, item wheels normally out of operative relation with the differential mechanisms, and keys and connections common to the item wheels for actuating the latter differentially and shifting the actuated wheels successively into operative relation with the differential mechanisms.

17. In a ten key machine; the combination of item wheels adjustable to represent amounts, classes of transactions and clerks; devices whereby said item wheels may be adjusted by a varying number of key operations to represent the amount, class and clerk handling each transaction; and differential devices controlled by said item wheels.

18. In a ten key machine; the combination of item wheels adjustable to represent amounts, classes of transactions and clerks; devices whereby said item wheels may be adjusted by a varying number of key operations to represent the amount, class and clerk handling each transaction, the number of key operations depending upon the number of denominational orders in the amount; and item entering mechanism controlled by the item wheels.

19. In a machine of the class described, the combination with a main operating mechanism, of a plurality of item wheels, an actuator for the item wheels, keys for actuating the actuator, means positively operated by the keys for shifting the item wheels successively into operative relation with the actuator, and means operated by the main operating mechanism for shifting the item wheels to normal position.

20. In a machine of the class described, the combination with a main operating mechanism, of a plurality of item wheels, an actuator for the item wheels, keys for actuating the actuator, means positively operated by the keys for shifting the item wheels successively into operative relation with the actuator, and means operated by the main operating mechanism for positively shifting the item wheels to normal position.

21. In a machine of the class described, the combination with a plurality of differential mechanisms, of item wheels normally out of operative relation therewith, keys and connections common to the item wheels for controlling the extent of differential movement of the item wheels and positively shifting the item wheels successively into operative relation with the differential mechanisms, and means for positively shifting the item wheels to normal position.

22. In a machine of the class described, the combination with a plurality of differentially movable segment gears, of item wheels normally out of operative relation with the segment gears, a series of keys, an actuator moved differentially by said keys, and normally out of operative relation with said item wheels, and means operated by the keys for shifting the item wheels one step upon each operation of a key and so constructed as to move an item wheel into operative relation with the actuator upon part of each step of movement so that the item wheel is actuated thereby and then to move the actuated item wheel the remaining part of the step into operative relation with one of the segment gears.

23. In a machine of the class described, the combination with a plurality of item wheels, of means controlling the extent of movement of the item wheels and normally out of operative relation therewith, keys controlling said controlling means, and means actuated by the keys and so constructed that during each operation of a key an item wheel is shifted into operative relation with the controlling means and moved differentially and then shifted out of operative relation with the controlling means.

24. In a machine of the class described, the combination with a plurality of item wheels, of means controlling the extent of movement of the item wheels and normally out of operative relation therewith, keys controlling said controlling means, means actuated by the keys and so constructed that during each depression of a key an item wheel is shifted into operative relation with the controlling means and moved differentially and then shifted out of operative relation with the controlling means, and means for disabling said shifting means upon return movement of the depressed key to normal position.

25. In a machine of the class described, the combination with a plurality of item wheels, of an actuator therefor, normally out of engagement therewith, means for shifting the item wheels into operative relation with the actuator, and a series of keys for operating the actuator and said means the latter being so constructed that during each operation of a key an item wheel is shifted into engagement with the actuator before the latter is operated, retained in engagement with the actuator during differential movement of the latter and finally shifted out of engagement with the actuator.

26. In a machine of the class described, the combination with a plurality of item wheels, of an actuator therefor, normally out of engagement therewith, means for shifting the item wheels into operative relation with the actuator, a series of keys for operating the actuator and said means the latter being so constructed that during each depression of a key an item wheel is shifted into engagement with the actuator before the latter is operated, retained in engagement with the actuator during differential movement of the latter and finally shifted out of engagement with the actuator, and means for disabling said shifting means upon return movement of the depressed key to normal position.

27. In a machine of the class described, the combination with a plurality of item wheels, of an actuator therefor, normally out of engagement therewith, a toothed member connected to said item wheels, a member having a cam ridge for coöperating with the toothed member to shift said item wheels, a plurality of keys and connections controlled by the keys for operating the actuator while an item wheel is in engagement with the latter and for operating said member the cam ridge being so constructed as to shift the item wheels one-half step to move one item wheel into engagement with the actuator, retain the engaged item wheel in engagement with the actuator so that the movement of the latter is imparted to the item wheel and finally shift the item wheels another one-half step during the operation of a key.

28. In a machine of the class described, the combination with a plurality of item wheels, of an actuator therefor, normally out of engagement therewith, a toothed member connected to said item wheels, a member having a cam ridge for coöperating with the toothed member to shift said item wheels, a plurality of keys, connections controlled by the keys for operating the actuators while an item wheel is in engagement with the latter and for operating said member the cam ridge being so constructed as to shift the item wheels one-half step to move one item wheel into engagement with the actuator, retain the engaged item wheel in engagement with the actuator so that the movement of the latter is imparted to the item wheel and finally shift the item wheels another one-half step during the depression of a key, and means for moving the toothed member to retain the latter out of operative relation with the cam ridge during the return movement of the depressed key to normal position.

29. In a machine of the class described, the combination with a plurality of item wheels, of means for controlling the differential movement of the same, a toothed element connected to said item wheels, a member having a cam ridge for coöperating with the toothed member for shifting an item wheel one-half step into position to be controlled by said controlling means and then shifting the wheel another half step, and keys for controlling said controlling means and operating said member.

30. In a machine of the class described, the combination with a plurality of item wheels, of means controlling the movement of the same, a toothed element connected to said item wheels, an oscillatory member having a cam ridge for coöperating with the toothed element upon movement of the member in one direction whereby an item wheel is shifted one-half step into position to be controlled by said controlling means and then shifted another half-step, keys for controlling said controlling means and operating said member, and means for moving the element out of coöperation with the cam ridge so that the latter does not shift the item wheels upon movement of the member in the opposite direction.

31. In a machine of the class described, the combination with a plurality of item wheels, of means controlling movement of the same, a toothed element connected to said item wheels, an oscillatory member having a cam ridge for coöperating with the toothed element upon movement of the member in one direction whereby an item wheel is shifted one-half step into position to be controlled by said controlling means and then shifted another half-step, keys for controlling said controlling means and operating said member, and means operated by said member for moving the element out of coöperation with the cam ridge so that the latter does not shift the item wheels upon movement of the member in the opposite direction.

32. In a machine of the class described, the combination with a plurality of item wheels, of an actuator therefor, normally out of engagement therewith, means for shifting the item wheels into operative relation with the actuator, a series of keys for operating the actuator and said means the latter being so constructed that during each depression of a key an item wheel is shifted into engagement with the actuator before the latter is operated, retained in engagement with the actuator during differential movement of the latter and finally shifted out of engagement with the actuator, and means operated by said shifting means for disabling said shifting means upon return movement of the depressed key to normal position.

33. In a machine of the class described, the combination with differential mechanisms, of item wheels normally out of operative relation with the differential mechanisms, keys and connections common to the item wheels for successively shifting the item wheels into operative relation with the differential mechanisms and controlling the extent of rotation of the item wheels, and means for locking all the item wheels against rotation while they are being shifted.

34. In a machine of the class described, the combination with differential mechanisms, of item wheels normally out of operative relation with the differential mechanisms, keys and connections common to the item wheels for actuating the latter differentially and shifting the actuated wheels successively into operative relation with the differential mechanisms, and means for locking the item wheels during the shifting movements of the same.

35. In a machine of the class described, the combination with a plurality of differentially movable segment gears, of a series of keys, an actuator moved differentially by said keys and normally out of operative relation with said item wheels, means operated by the keys for shifting the item wheels one step upon each operation of a key and so constructed as to move an item wheel into operative relation with the actuator upon part of each step of movement so that the item wheel is rotated thereby and then to move the rotated item wheel the remaining part of the step into operative relation with one of the segment gears, and means for locking the item wheels against rotation when they are out of operative relation with the actuator and the differential mechanism.

36. In a machine of the class described, the combination with a plurality of differential mechanism, of item wheels normally out of operative relation therewith, keys and connections for controlling the extents of differential rotation of the item wheels and positively shifting the item wheels successively into operative relation with the differential mechanisms, a main operating mechanism, means operated by the main operating mechanism for rotating the wheels to zero position, and means for shifting the item wheels to normal position.

37. In a machine of the class described, the combination with a main operating mechanism, of a plurality of item wheels, an actuator for the item wheels, keys for differentially rotating the item wheels, means operated by the keys for positively shifting the wheels successively into operative relation with the actuator, means operated by the main operating mechanism for rotating the item wheels to zero position, and means operated by the main operating mechanism for shifting the item wheels to normal position.

38. In a machine of the class described, the combination with a plurality of differentially movable segment gears, of a series of keys, item wheels normally out of operative relation with the segment gears, an actuator moved differentially by said keys and normally out of operative relation with said item wheels, means operated by the keys for shifting the item wheels one step upon each operation of a key and so constructed as to move an item wheel into operative relation with the actuator upon part of each step of movement so that the item wheel is rotated thereby and then to move the rotated item wheel the remaining part of the step into operative relation with one of the segment gears, a main operating mechanism, means operated by the operating mechanism for turning the item wheels to zero for the purpose of actuating the segment gears, and means actuated by the operating mechanism for shifting the item wheels to normal position.

39. In a machine of the class described, the combination with a plurality of segment gears, of differentially movable wheels normally out of engagement therewith, keys and connections for controlling the differential movements of the wheels and for positively shifting the wheels directly into engagement with the segment gears, and means for positively shifting the wheels to normal position.

40. In a machine of the class described, the combination with segment gears, of differentially movable wheels, normally out of engagement therewith, keys and connections for controlling the differential movements of the wheels and for positively shifting the wheels one step upon each operation of a key directly into engagement with the segment gears, and means for positively shifting the wheels to normal position.

41. In a machine of the class described, the combination with a plurality of segment gears, of differentially movable wheels normally out of engagement therewith, and keys and connections for controlling the differential movements of the wheels and for positively shifting the wheels directly into engagement with the segment gears.

42. In a machine of the class described, the combination with segment gears, of differentially movable wheels, normally out of engagement therewith, and keys and connections for controlling the differential movements of the wheels and for positively shifting the wheels one step upon each operation of a key directly into engagement with the segment gears.

43. In a machine of the class described, the combination with a plurality of segment gears, of differentially movable wheels normally out of engagement therewith, and keys and connections for controlling the differential movements of the wheels and for positively shifting the wheels directly into engagement with the segment gears, and means for turning the wheels to zero differentially to rotate the segment gears in engagement therewith.

44. In a machine of the class described, the combination with a plurality of segment gears, of differentially movable wheels normally out of engagement therewith, keys and connections for controlling the differential movements of the wheels and for positively shifting the wheels directly into engagement with the segment gears, and operating mechanism for turning the wheels to zero differentially to rotate the segment gears in engagement with the wheels and for shifting the wheels to normal position.

45. In a machine of the class described, the combination with a plurality of segment gears, of differentially movable wheels normally out of engagement therewith, keys and connections for controlling the differential movement of the wheels and for shifting the wheels directly into engagement with the segment gears, means for turning the wheels to zero differentially to rotate the segment gears in engagement therewith, and indicating means moved differentially and directly from one indicating position to another in accordance to the differential movement of the segment gears.

46. In a machine of the class described, the combination with an actuator, of segment gears, wheels successively actuated by the actuator and normally out of engagement with segment gears, and keys for positively shifting said segment gears directly and successively into engagement with the actuator and segment gears.

47. In a machine of the class described, the combination with keys, of item wheels, means operated by the depression of a key for shifting the item wheels one step and disabled during the return movement of a depressed key to normal position, operating mechanism for shifting the item wheels to normal position, and means operated by the operating mechanism for disabling the shifting means operated by the keys to permit the item wheels to be shifted to normal position during the operation of the machine.

48. In a machine of the class described, the combination with keys, of item wheels, means operated by the depression of a key for shifting the item wheels one step and disabled during the return movement of a depressed key to normal position, an alining device for alining the item wheels in shifted position during the return movement of the depressed key, a device for shifting the item wheels to normal position, and operating mechanism for operating said shifting device and for operating said alining device to disable the shifting means operated by the keys to permit the item wheels to be shifted to normal position during the operation of the machine.

49. In a machine of the class described, the combination with keys, of item wheels, means operated by the depression of a key for positively shifting the item wheels one step and disabled during the return movement of a depressed key to normal position, operating mechanism for shifting the item wheels to normal position and means operated by the operating mechanism for disabling the shifting means operated by the keys to permit the item wheels to be shifted to normal position during the operation of the machine.

50. In a machine of the class described, the combination with item wheels each adapted to represent amounts and classes of transactions and having a series of digits representing amounts and a series of characters representing the classes of transactions, and a cabinet having sight openings arranged so that the digits on the item wheel used to represent an amount may be viewed and so that a character on the item wheel used to represent a class of transactions may be viewed.

51. In a machine of the class described, the combination with a single series of keys representing amounts and classes of transactions, of item wheels controlled by the keys and each wheel adapted to represent amounts and classes of transactions and having a series of digits for representing amounts and a series of characters for representing the classes of transactions, and a cabinet having sight openings so arranged that a digit on an item wheel may be viewed when the wheel is employed to represent an amount and so that a character on an item wheel may be viewed when the wheel is employed to represent a class of transactions.

52. In a machine of the class described, the combination with a single series of keys adapted to represent amounts or classes of transactions dependent upon their order of operation, of item wheels controlled by the keys and each wheel adapted to represent amounts or classes of transactions and having a series of digits representing amounts and a series of characters representing classes of transactions, means actuated by the keys for successively shifting the item wheels into position to be controlled by the keys, and a cabinet having sight openings behind which the item wheels pass into displaying positions, the sight openings being so arranged that the wheels representing amounts display the digit and the wheel representing the class of transaction displays one of its characters.

53. In a machine of the class described, the combination with a series of keys each of which represents an amount and a class of transactions, of amount differential mechanism controlled by the keys operated to represent an amount, accounting mechanism operated by the amount differential mechanism, transaction differential mechanism controlled by the key operated to represent the class of transactions, and means controlled by the keys for preventing operation of the accounting device when one of the keys representing certain classes of transactions is operated to represent the class of transactions.

54. In a machine of the class described, the combination with a series of keys each of which represents an amount, a clerk's initial, and a class of transactions, of amount differential mechanism controlled by the keys operated to represent an amount, accounting mechanism operated by the amount differential mechanism, clerks' differential mechanism controlled by the key operated to represent the clerk's initial, transaction differential mechanism controlled by the key operated to represent the class of transactions, and means controlled by the keys for preventing operation of the accounting device when one of the keys representing certain classes of transactions is operated to represent the class of transactions.

55. In a machine of the class described, the combination with a series of keys, of differential mechanism adapted to be controlled by any of said keys, accounting mechanism controlled by said differential mechanism, and means operated by certain of said keys for preventing the control of said accounting device by the differential mechanism.

56. In a machine of the class described, the combination with a series of keys, of a totalizer, differential mechanism therefor normally out of operative relation therewith, means for establishing operative relation between the totalizer and the differential mechanism, and means for preventing the establishment of operative relation between the totalizer and the differential mechanism when certain of said keys are operated in a certain order relative to other operated keys.

57. In a machine of the class described, the combination with a plurality of keys one of which represents an amount and a "no sale" while each of the other keys represents an amount and a class of transactions, of amount differential mechanism controlled by the keys operated to represent an amount, accounting mechanism operated by the amount differential mechanism, transaction differential mechanism controlled by the key operated to represent the class to which the transaction belongs and means controlled by the keys for preventing operation of the accounting device when the key representing an amount and a "no sale" is operated to represent a "no sale".

58. In a machine of the class described, the combination with a plurality of keys one of which represents an amount, a clerk's initial, and a "no sale" while each of the other keys represents an amount, a clerk's initial, and a class of transactions, of amount differential mechanism controlled by the keys operated to represent an amount, accounting mechanism operated by the amount differential mechanism, clerks' differential mechanism controlled by the key operated to represent the clerk's initial, transaction differential mechanism controlled by the key operated to represent the class to which the transaction belongs and means controlled by the keys for preventing operation of the accounting device when the key representing an amount and a "no sale" is operated to represent a "no sale".

59. In a machine of the class described, the combination with a plurality of keys one of which represents an amount and a "no sale" while each of the other keys represents an amount and a class of transactions, of amount differential mechanism controlled by the keys operated to represent an amount, accounting mechanism operated by the amount differential mechanism, transaction differential mechanism controlled by the key operated to represent the class to which the transaction belongs, and means controlled by the keys for preventing operation of the accounting device when the key representing an amount and a "no sale" is operated to represent a "no sale" or when one of the keys representing certain classes of transactions is operated to represent the class to which the transaction belongs.

60. In a machine of the class described, the combination with a series of keys each of which represents an amount and a class of transactions, of amount differential mechanism controlled by the keys first operated to represent the amount, accounting mechanism operated by the amount differential mechanism, transaction differential mechanism controlled by the key operated last, and means controlled by the keys for preventing operation of said accounting device when one of the keys representing certain classes of transactions is operated last.

61. In a machine of the class described, the combination with a series of keys each of which represents an amount, a clerk's initial, and a class of transactions, of amount differential mechanism controlled by the keys first operated to represent the amount, accounting mechanism operated by the amount differential mechanism, clerks' differential mechanism controlled by the key operated after the keys representing the amount are operated, transaction differential mechanism controlled by the key operated last, and means controlled by the keys for preventing operation of said accounting device when one of the keys representing certain classes of transactions is operated last.

62. In a machine of the class described, the combination with a series of keys each of which represents an amount and a class of transactions, of amount differential mechanism controlled by the keys first operated to represent the amount, the number of keys operated to represent the amount being dependent upon the denomination of the amount, accounting mechanism operated by the amount differential mechanism, transaction differential mechanism controlled by the key operated last, and means controlled by the keys for preventing operation of said accounting device when one of the keys representing certain classes of transactions is operated last.

63. In a machine of the class described, the combination with a series of keys each of which represents an amount, a clerk's initial, and a class of transactions, of amount differential mechanism controlled by the keys first operated to represent the amount, the number of keys operated to represent the amount being dependent upon the denomination of the amount, accounting mechanism operated by the amount differential mechanism, clerks' differential mechanism controlled by the key operated after the keys representing the amount are operated, transaction differential mechanism controlled by the key operated last, and means controlled by the keys for preventing operation of said accounting device when one of the keys representing certain classes of transactions is operated last.

64. In a machine of the class described, the combination with a series of keys, each of which represents an amount and a class of transactions, of amount differential mechanism controlled by the keys operated to represent an amount, a totalizer operated by said differential mechanism and normally out of engagement therewith, means for moving the totalizer into engagement with the amount differential mechanism, transaction differential mechanism controlled by the key operated to represent the class of transactions to which the transaction belongs, and means for disabling the engaging means when one of the keys representing certain classes of transactions is operated to represent the class of transactions to which the transaction belongs.

65. In a machine of the class described, the combination with a series of keys, each of which represents an amount and a class of transactions, of amount differential mechanism controlled by the keys operated to represent an amount, the number of keys operated to represent the amount being dependent upon the denomination of the amount, a totalizer operated by said differential mechanism and normally out of engagement therewith, means for moving the totalizer into engagement with the amount differential mechanism, transaction differential mechanism controlled by the key operated to represent the class of transactions to which the transaction belongs, and means for disabling the engaging means when one of the keys representing certain classes of transactions is operated to represent the class of transactions to which the transaction belongs.

66. In a machine of the class described, the combination with a totalizer, of a plurality of keys each of which represents an amount and a class of transactions, for controlling the entering in the totalizer of the amounts represented by the keys operated to represent the amounts, and means for preventing the entering of an amount in the totalizer when one of the keys representing certain classes of transactions is operated to represent the class of transactions to which the amount belongs.

67. In a machine of the class described, the combination with a plurality of keys each representing an amount and a class of transactions, of differential mechanism controlled by the keys operated to represent the amount, a totalizer operated by the differential mechanism, printing means operated by the differential mechanism, printing means controlled by the key operated to represent the class to which a transaction belongs, and means for preventing the entering of amounts of transactions in the totalizer when the transactions belong to certain classes.

68. In a machine of the class described, the combination with a plurality of keys each representing an amount, a clerk's initial, and a class of transactions, of differential mechanism controlled by the keys operated to represent the amount, a totalizer operated by the differential mechanism, printing means operated by the differential mechanism, printing means controlled by the key operated to represent the class to which a transaction belongs, printing means controlled by the key operated to represent the clerk's initial, and means for preventing the entering of amounts of transactions in the totalizer when the transactions belong to certain classes.

69. In a machine of the class described, the combination with a plurality of keys, each representing an amount and a class of transactions, of differential mechanism controlled by the keys which are operated first to represent the amount, a totalizer operated by the differential mechanism, printing means operated by the differential mechanism, printing means controlled by the key last operated to represent the class of the transaction, and means for preventing the entering of amounts of transactions in the totalizer when the transactions belong to certain classes.

70. In a machine of the class described, the combination with a plurality of keys, each representing an amount and a class of transactions, of differential mechanism controlled by the keys which are operated first to represent the amount, the number of keys operated to represent the amount being dependent upon the denomination of the amount, a totalizer operated by the differential mechanism, printing means operated by the differential mechanism, printing means controlled by the key last operated to represent the class of the transaction, and means for preventing the entering of amounts of transactions in the totalizer when the transactions belong to certain classes.

71. In a machine of the class described, the combination with a plurality of keys, each representing an amount and a class of transactions, of differential mechanism controlled by the keys which are operated first to represent the amount, a totalizer operated by the differential mechanism, printing means operated by the differential mechanism, printing means controlled by the key last operated to represent the class to which the transaction belongs, and means operated by the keys for preventing the entering of amounts of transactions in the totalizer when the transactions belong to certain classes.

72. In a machine of the class described, the combination with a plurality of keys, each representing an amount and a class of transactions, of differential mechanism controlled by the keys which are operated first to represent the amount, the number of keys operated to represent the amount being dependent upon the denomination of the amount, a totalizer operated by the differential mechanism, printing means operated by the differential mechanism, printing means controlled by the key last operated to represent the class to which the transaction belongs, and means operated by the keys for preventing the entering of amounts of transactions in the totalizer when the transactions are of certain classes.

73. In a machine of the class described, the combination with a plurality of keys one of which represents an amount and a "no sale" while each of the others represents an amount and a class of transaction, of indicating means and printing means controlled by the keys operated to represent an amount, indicating means and printing means controlled by the key operated to represent the class of transactions, or a "no sale," and means for concealing the indication of the amount when the key representing an amount and a "no sale" is operated to represent a "no sale."

74. In a machine of the class described, the combination with a plurality of keys one of which represents an amount and a "no sale" while each of the others represents an amount and a class of transactions, of indicating means and printing means controlled by the keys operated to represent an amount, indicating means and printing means controlled by the key operated to represent the class of transactions or a "no sale," and means for concealing the indication of the amount when the key representing an amount and a "no sale" is operated to represent a "no sale," a totalizer for accumulating the amounts set up on the amount indicating means, and means for preventing the entering of amounts of transactions in the totalizer when the transactions are of certain classes.

75. In a machine of the class described, the combination with a plurality of keys one of which represents an amount and a "no sale" while each of the others represents an amount and a class of transactions, of indicating means and printing means controlled by the keys operated to represent an amount, the number of keys operated to represent the amount being dependent upon the denomination of the amount, indicating means and printing means controlled by the key operated to represent the class of transactions or a "no sale," and means for concealing the indication of the amount when the key representing an amount and a "no sale" is operated to represent a "no sale."

76. In a ten key machine, a totalizer, item entering mechanism, normally effective means whereby operation of the item entering mechanism will actuate the totalizer, and connections controlled by certain ones of the ten keys for disabling said means whereby to render the item entering mechanism ineffective upon the totalizer.

77. In a machine of the class described, the combination with accounting devices of different classes, of differential mechanisms for the accounting device, item wheels normally out of operative relation with the differential mechanisms, keys and connections common to the item wheels for moving the item wheels into operative relation with the differential mechanisms and controlling the extent of rotation of the item wheels, and means for returning the item wheels to zero after each operation of the machine.

78. In a machine of the class described, the combination with accounting devices of different classes, of differential mechanisms therefor, item wheels normally out of operative relation with the differential mechanisms, keys and connections common to the item wheels for actuating the latter differentially and shifting the actuated wheels successively into operative relation with the differential mechanisms, and means for restoring the item wheels to zero after each operation of the machine.

79. In a machine of the class described, the combination with accounting devices of different classes of differential mechanisms for the accounting device, item wheels which normally stand at zero and which are normally disengaged from the differential mechanisms, and keys and connections common to the item wheels for moving the item wheels into operative relation with the differential mechanisms and controlling the extent of rotation of the item wheels.

In testimony whereof I affix my signature.

FREDERICK L. FULLER.

Copies of this patent may be obtained for five cents each, by addressing the "Commissioner of Patents, Washington, D. C."